United States Patent [19]

Davies

[11] Patent Number: 5,428,804
[45] Date of Patent: Jun. 27, 1995

[54] EDGE CROSSING CIRCUITRY FOR SIMD ARCHITECTURE

[75] Inventor: Daniel Davies, Palo Alto, Calif.

[73] Assignee: Xerox Corporation, Stamford, Conn.

[21] Appl. No.: 993,286

[22] Filed: Dec. 18, 1992

[51] Int. Cl.⁶ .................. G06F 15/80; G06F 15/62
[52] U.S. Cl. ...................... 395/800; 364/DIG. 1; 395/200
[58] Field of Search .......................... 395/800

[56] References Cited

U.S. PATENT DOCUMENTS

| | | | |
|---|---|---|---|
| 4,314,349 | 2/1982 | Batcher | 364/716 |
| 4,742,552 | 5/1988 | Andrews | 382/41 |
| 4,831,519 | 5/1989 | Morton | 364/200 |
| 4,850,027 | 7/1989 | Kimmel | 382/49 |
| 5,129,092 | 7/1992 | Wilson | 395/800 |
| 5,146,606 | 9/1992 | Grondalski | 395/800 |
| 5,173,947 | 12/1992 | Chande et al. | 382/41 |
| 5,173,951 | 12/1992 | McMahon | 382/54 |
| 5,222,214 | 6/1993 | Kobayashi | 395/164 |
| 5,325,500 | 6/1994 | Bell et al. | 395/425 |

FOREIGN PATENT DOCUMENTS

293701A2  12/1988  European Pat. Off. ..... G06F 15/06

*Primary Examiner*—Alyssa H. Bowler
*Assistant Examiner*—Denise Tran

[57] ABSTRACT

A parallel processor includes processing units, edge crossing circuitry, data transfer circuitry, interconnecting circuitry, and control circuitry. The edge crossing circuitry can receive an item of data that includes plural bits and can bit serially provide the item of data. The data transfer circuitry connects the processing units to the edge crossing circuitry. The interconnecting circuitry interconnects the processing units and the edge crossing circuitry. The processing units can be interconnected in pairs to form an array. The interconnections could form an array-wide shift register. The edge crossing circuitry can be interconnected to transfer items of data bit serially to processing units at the edges of the array, and can include a shift register. To perform an edge crossing operation involving first and second segments of an image, the data transfer circuitry can transfer a first item of data obtained from the processing units to the edge crossing circuitry; the edge crossing circuitry can provide a bit from the first item of data to one of the edge processing units; and one of the processing units can use the bit to obtain a second item of data relating to a part of the second segment that is across an edge from a part of the first segment to which the first item relates. The edge crossing operation can extend an arbitrary distance across the edge into the first segment. The edge crossing circuitry can also perform K-bit shifting, such as for K-bit pixels.

14 Claims, 13 Drawing Sheets

EDGE CROSSING CIRCUITRY FOR SIMD ARCHITECTURE

BACKGROUND OF THE INVENTION

The present invention relates to techniques for processing an image in segments.

Data defining an image sometimes exceeds the capacity of a processor. Some prior art techniques divide an image into segments or tiles, each of which is small enough to be handled by the processor. Some operations cannot be performed at edges of segments, however, because they require data from adjacent segments. Therefore, some prior art techniques divide an image into overlapping segments, with the overlapping area at each edge being large enough that all operations can be validly performed in part of each segment. The results from the segment parts in which the operations are validly performed can then be combined to produce valid results for the entire image. Such techniques are inefficient, because the operations are also performed on the overlapping areas, obtaining invalid results.

Wilson, EP-A 293 701 (Wilson '701), describes parallel neighborhood processing techniques for matrices of numbers such as images. As shown and described in relation to FIG. 1, a parallel processing system includes an array of processing units each with a neighborhood processing element, data input and output means which are shift registers, and memory. Each neighborhood processing element can receive data from the processing elements on its immediate left and right. Left and right redundant co-memories support the memories of the left and right processing units, and provide appropriate neighborhood data to the right and left neighborhood processing elements, respectively. A duplicate copy of a data word transmitted to the left or right memory is also transmitted to and stored in the left or right co-memory, respectively.

Wilson '701 describes, in relation to FIGS. 2 and 3, how an image structure of W columns and H rows can be mapped into the memories. The data matrix is broken down into subsections, each with n columns and H rows, where n is equal to the number of processing units. The subsections, called ribbons, can be stored in the memories. At col. 9 line 55-col. 10 line 14, Wilson '701 indicates how the left processing element corresponds to the left edge of a ribbon and is connected to the right co-memory, which can be addressed to obtain the right edge of an adjacent ribbon. The right processing element, the right edge of a ribbon, is similarly connected to the left co-memory, which can be addressed to obtain the left edge of an adjacent ribbon.

Wilson '701 describes read cycles in relation to FIGS. 5A-5D, and write cycles in relation to FIGS. 6A-6D. In a read cycle, the co-memory addresses are displaced from the memory addresses, as shown by the cross-hatched areas.

SUMMARY OF THE INVENTION

The invention deals with problems in processing an image in segments.

As noted above, some prior art techniques process an image in overlapping segments. Such a technique is inefficient on a parallel processor in which each processing unit performs operations for a part of a segment. Near each edge, some processing units cannot obtain data relating to nearby parts of an adjacent segment that is across the edge. Therefore, those processing units produce invalid results, so that other processing units must perform the same operation for the same location, but in a different segment, an overlapping segment that includes data relating to all nearby parts of the image affected by the operation. The redundant operations are inefficient and require a relatively complicated decision about which results to save for each location. This decision is especially complicated in parts of the image where four segments overlap. Furthermore, if an operation involves data that is relatively far away within the image, the amount of overlap between segments must increase, which greatly decreases efficiency.

The techniques described by Wilson '701, described above, enable an array of n processing units to process an image with W columns and H rows, where W is, for example, four times as great as n. Wilson '701 describes a technique that divides a data matrix into subsections with n columns and H rows. Co-memories make it possible to perform operations that cross edges between subsections. But each co-memory is only as wide as the memory of a processing unit, so that an operation can only extend a short distance across a subsection edge. Also, the co-memories add cost and require relatively complex address circuitry so that read and write operations can be handled differently.

The invention is based on the discovery of an elegant technique that alleviates the problems that affect the techniques described above. The technique of the invention provides simple edge crossing circuitry that can receive an item of data and provide it bit serially, i.e. one bit at a time. The technique also provides data transfer circuitry connecting processing units to the edge crossing circuitry so that an item of data obtained from the processing units can be transferred to the edge crossing circuitry. Interconnecting circuitry connects the processing units to each other in pairs to form an array and also connects the edge crossing circuitry so that it can provide an item of data bit serially to a processing unit at an edge of the array. A processing unit at an edge of an array is referred to herein as an "edge processing unit"; a one-dimensional array, for example, includes two edge processing units.

As a result of the technique, an operation can be performed efficiently and without co-memories even though the operation requires data from across an edge of an image segment. Therefore, non-overlapping segments can be handled efficiently in a parallel processor.

The technique can be implemented in a parallel processor that also includes control circuitry. The control circuitry provides signals to the processing units, the data transfer circuitry, and the edge crossing circuitry. The control signals cause the data transfer circuitry to transfer a first item of data obtained from the processing units to the edge crossing circuitry; the first item of data relates to part of a first segment of an image that includes a second segment adjacent to the first segment along an edge. The control signals also cause the edge crossing circuitry to provide a bit from the item of data to an edge processing unit at the edge of the array. Finally, the control signals cause the processing units to perform an operation in which the edge processing unit uses the bit from the first item of data to obtain a second item of data relating to part of the second segment that is across the edge from the first segment.

The technique could be implemented, for example, in a single instruction multiple data (SIMD) parallel processor in which the control circuitry also provides instruction data defining instructions to processing circuitry in each processing unit in parallel. The processing circuitry of each processing unit can include an internal shift register connected to internal shift registers in two adjacent processing units to form a one-dimensional array with an array-wide shift register. In addition, the internal shift registers of the edge processing units can be connected to a shift register in the edge crossing circuitry so that data from the edge crossing shift register can be shifted into either edge processing unit. The processing units of all the processing units can be operated in parallel to shift, data in either direction through the array. When a bit is transferred from the internal shift register of one edge processing unit to one end of the edge crossing shift register, another bit is concurrently transferred from the other end of the edge crossing shift register to the other edge processing unit.

The data transfer circuitry can include a bus connected for receiving an item of data from any of the processing units and for providing an item of data to the edge crossing circuitry. The control signals can initially cause an item of data to be transferred by the bus to the edge crossing circuitry. For further edge crossing, the control signals can cause transfer of an item of data from a processing unit next to the edge processing unit in the array, and so forth.

The edge crossing shift register can be loaded in parallel. An item of data can be loaded so that the appropriate end of the item can be shifted to each edge processing unit. For example, if the array includes a left edge processing unit at a left edge of the array and a right edge processing unit at a right edge, an item of data can be loaded so that its right end can be shifted first into the left edge processing unit and so that its left end can be shifted first into the right edge processing unit.

The shift register could be cleared or loaded with a constant value when appropriate to provide data defining blank pixels beyond an edge of an image.

The technique can be extended to handle multi-bit pixels such as gray scale or color pixels. For K-bit pixels, the edge crossing shift register could be shifted K times to provide a pixel to an edge processing unit. Or the edge crossing shift register could include special circuitry permitting a K-bit shift in a single cycle. Or the edge crossing circuitry could include additional circuitry connected to receive an item of data from the edge crossing shift register. The additional circuitry would provide a K-bit shifted version of the item to the edge crossing shift register on the next cycle, providing K-bit shifting in two cycles.

The technique of the invention is inexpensive compared to other approaches. In addition, it allows extended edge crossing to any length, which is especially important for multi-bit pixels. Because the shift register need not be addressed, it can be loaded at any time between shift operations, so that loading can overlap with other operations, a significant advantage compared to co-memories.

The following description, the drawings, and the claims further set forth these and other aspects, objects, features, and advantages of the invention.

DETAILED DESCRIPTION

A. Conceptual Framework

Figure 1:
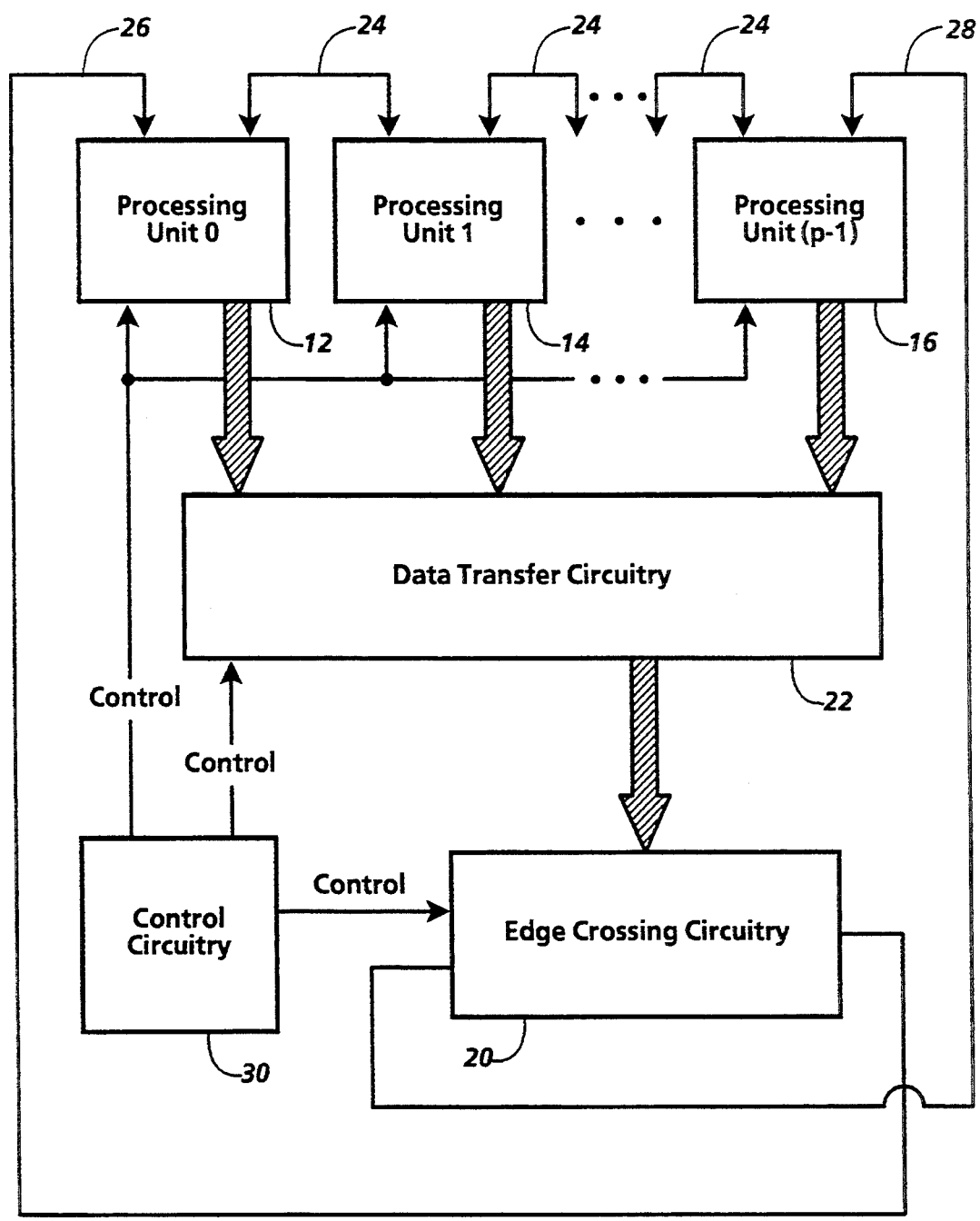
FIG. 1 is a schematic block diagram showing general components of a parallel processor that includes edge crossing circuitry.

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of 2N values.

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

An operation or a signal "writes" or "Sets" memory circuitry or a memory cell by storing data in the memory circuitry or memory cell. If the data stored is different than data previously stored in the memory circuitry or memory cell, the operation or signal "changes" the data. An operation or a signal "reads" memory circuitry or a memory cell by producing data indicating the value of data currently stored in the memory circuitry or memory cell. Memory circuitry or a memory cell is "accessed" by any operation or signal that reads or writes the memory circuitry or memory cell. An item of data currently stored in memory circuitry or a memory cell is "accessed" by an operation or signal that reads the item of data or that writes another item of data, possibly identical to the current item of data, in place of the current item of data. An operation or signal "addresses" a memory cell within memory circuitry that includes plural memory cells by selecting the memory cell to be accessed. An operation or signal "enables" an access operation by putting memory circuitry or memory cell into a state in which it can be read or written.

An "array" of memory cells is a number of memory cells that are addressed or accessed in an interdependent manner.

A "register" is memory circuitry that includes an array of memory cells for temporary storage of data. A "shift register" is a register in which the data stored in each of the memory cells can be shifted along a dimension of the array to a next memory cell. If the shift register includes a one-dimensional array of memory cells, each storing a bit of data, the shifting operation can receive and store a series of bits of data or it can provide a series of bits of data as output.

A "processor" is any circuitry that can process data, and may include one or more central processing units or other processing components. A "processing unit" is a processor that is a component within another processor. "Processing circuitry" is circuitry within a processor or processing unit that processes data. A "microprocessor" is a processor in the form of circuitry on a substrate.

A processor or other component of circuitry "operates on" an item of data by performing an operation that includes obtaining a resulting item of data that depends on the item of data operated on. For example, the resulting item of data could result from an operation that accesses the item of data operated on or from a logical or numerical operation on the item of data operated on.

A "block" of items of data is a number of items of data that form a sequence.

A processor or other component of circuitry "uses" an item of data in performing an operation when the result of the operation depends on the value of the item. For example, the operation could perform a logical or numerical operation on the item or could use the item to access another item of data.

An "address" is an item of data that can be used to address a memory cell within memory circuitry that includes plural memory cells.

An "instruction" is an item of data that a processor can use to determine its own operation. A processor "executes" a set of instructions when it uses the instructions to determine its operations. Execution of instructions "causes" a processor to perform an operation when the processor performs the operation in the process of executing the instructions.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

An "image" is a pattern of light.

An image may be divided into "segments," each of which is itself an image. A segment of an image may be of any size up to and including the whole image.

An "array of data" or "data array" or "array" is a combination of items of data that can be mapped into an array. A "two-dimensional array" is a data array whose items of data can be mapped into an array having two dimensions.

An item of data "defines" an image when the item of data includes sufficient information to produce the image. For example, a two-dimensional array can define all or any part of an image, with each item of data in the array providing a value indicating the color of a respective location of the image.

A "pixel" is the smallest segment of an image whose value is indicated in an item of data defining the image. In an array defining an image in which each item of data provides a value indicating a color, each value may be called a "pixel value". Each pixel value is a bit in the "binary form" of the image, a gray scale value in a "gray scale form" of the image, or a set of color space coordinates in a "color coordinate form" of the image, the binary form, gray scale form, and color coordinate form each being a two-dimensional array defining the image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

A "neighborhood operation" is an image processing operation that uses data relating to one part of an image to obtain data relating to another part of an image.

A segment of an image is adjacent to another segment of the image "along an edge" if the two adjacent segments meet at the edge and do not overlap. A part of one segment of an image is "across an edge" from a part of another segment of the image if the two parts are on opposite sides of the edge; this can occur where the two segments are adjacent along the edge or where the two segments overlap but the parts are on opposite sides of an edge of one of the segments.

An "edge crossing operation" is a neighborhood operation that uses an item of data relating to a part of a first image segment to obtain data relating to a part of a second, adjacent image segment across an edge from the part of the first image segment.

A first component provides a signal to a plurality of other components "in parallel" when all of the other components receive the signal from the first component at approximately the same time.

An operation or component can provide or transfer an item of data to a single receiving component "in parallel" if the item of data includes a plurality of bits and the receiving component receives all of the bits at approximately the same time.

An operation or component "bit serially" provides an item of data or transfers an item of data "bit serially" if the item of data includes a plurality of bits and the operation or component provides or transfers the bits one at a time.

"Edge crossing circuitry" is used herein to mean circuitry that can receive an item of data and bit serially provide it to another component as part of an edge crossing operation. In addition to bit serially providing the item of data, the edge crossing circuitry might include circuitry that can provide the item of data as a sequence of K-bit items.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

A first component "controls" a second component when signals from the first component determine how the second component operates. Signals "cause" or "control" an operation of a component if the signals determine how the operation is performed.

An operation or component "shifts" an item of data if the item of data includes a plurality of values, each at a starting position in a sequence within the item of data, and the operation or component produces another item of data in which the positions of the values are uniformly shifted from their starting positions, preserving the sequence. An operation or component "K-bit shifts" an item of data or shifts the item of data "by K bits" if the values are binary and are uniformly shifted by K positions. A second item of data produced when a first item of data is shifted by K bits us a "K-bit shifted version" of the first item of data.

"Shifting circuitry" is circuitry that can shift an item of data. A shift register is an example of shifting circuitry. Shifting circuitry may have first and second ends: If an item of data extends from the first end to the second end and it is shifted from the second end toward the first end, one or more values can be "transferred from the first end" and one or more values can be "transferred to the second end."

Any two components are "connected" when there is a combination of circuitry that can transfer signals from one of the components to the other. For example, two components are "connected" by any combination of connections between them that permits transfer of signals from one of the components to the other. Similarly, a plurality of components are "interconnected" when each component is connected to every other component in the plurality through some combination of connections.

Signals cause a plurality of shift registers or other components of shifting circuitry to "shift concurrently" if the signals determine that the components shift at approximately the same time so that, if an end of one of the components from which values are transferred were connected to an end of another of the components, the values would be transferred to the end of the other component.

"Connecting circuitry" is circuitry that connects two or more components. "Interconnecting circuitry" is circuitry that interconnects a plurality of components. The components are interconnected "into an array" by interconnecting circuitry that permits transfer of data to and from a component that can be mapped to a given position in an array only through connections to other components that can be mapped to adjacent positions in the array. The array is "one-dimensional" if each component has at most two adjacent components, so that the components together can be mapped onto a line according to their interconnections.

An array of processing units or other components has "an array edge" or "an edge" if the processing units can be mapped onto an array that has an edge. For example, an c, pen one-dimensional array of processing units has two edges, one at each end. A processing unit at an edge is referred to herein as an "edge processing unit" and a processing unit that is not at an edge is referred to herein as an "internal processing unit."

"Bus circuitry" or a "bus" is circuitry connecting a plurality of components, at least one of which is a "source" and at least one of which is a "destination," such that the bus circuitry is capable of transferring a signal provided by any of the sources to all of the destinations. Some devices connected to bus circuitry can act either as sources or destinations.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

A "parallel processor" is a processor that includes more than one processing unit, each able to perform operations on data in parallel with the others.

B. General Features

Figure 2A:
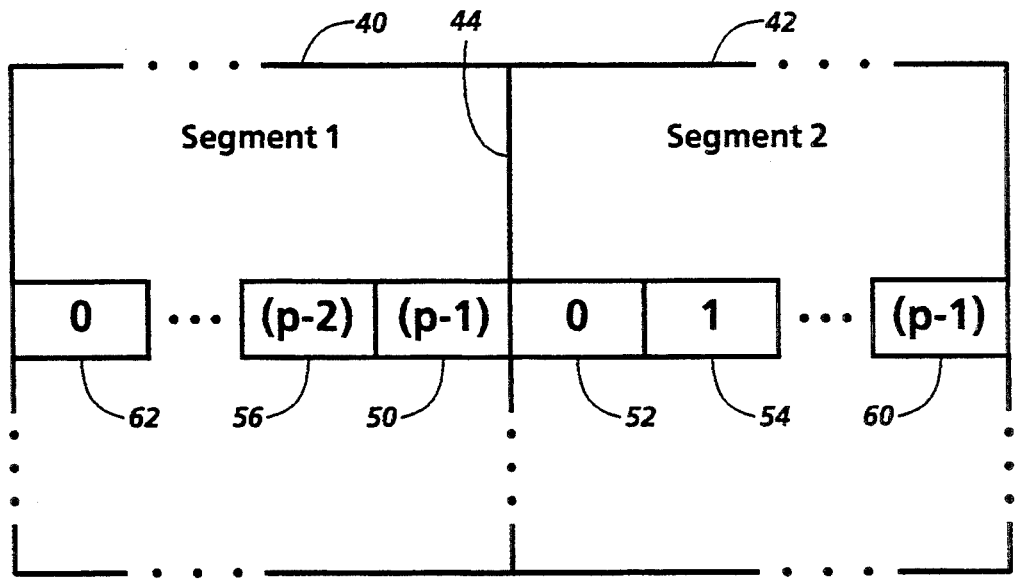
FIG. 2A is a schematic diagram illustrating parts of adjacent image segments that meet along an edge.
Figure 2B:
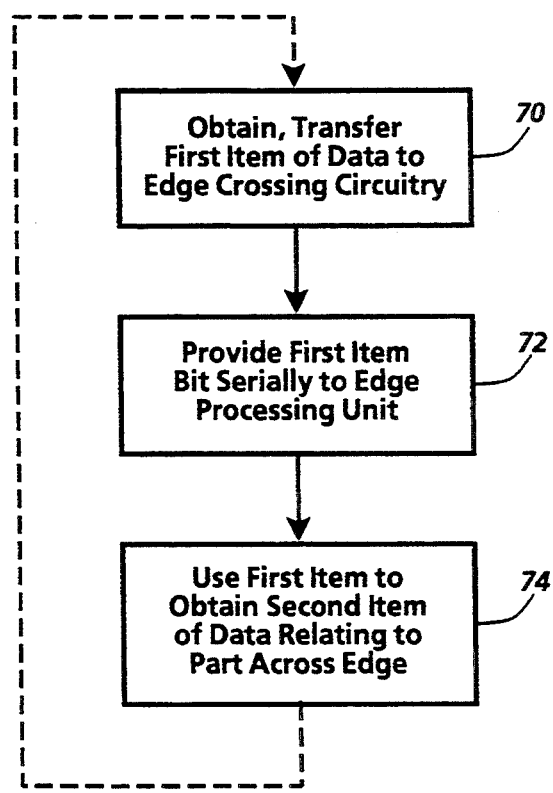
FIG. 2B is a flow chart showing general acts in operating the edge crossing circuitry of FIG. 1.

FIGS. 1–2B illustrate general features of the invention. FIG. 1 shows components of a parallel processor that includes edge crossing circuitry. FIG. 2A shows the relationship of parts of adjacent image segments. FIG. 2B shows general acts in operating edge crossing circuitry.

Parallel processor 10 in FIG. 1 includes p processing units 12 and 14 through 16, illustratively numbered from zero through (p−1). Parallel processor 10 could for example be a SIMD parallel processor with an array of processing units including processing units 12 and 14 through 16. Processing units 12 and 16 are at the edges of the array and are therefore referred to as edge processing units.

Parallel processor 10 also includes edge crossing circuitry 20 and data transfer circuitry 22. Edge crossing circuitry 20 can receive an item of data and provide it bit serially, i.e. one bit at a time. Data transfer circuitry 22 connects the processing units to edge crossing circuitry 20 so that it can transfer an item of data obtained from the processing unit to edge crossing circuitry 20. Therefore, edge crossing circuitry 20 can receive an item of data from data transfer circuitry 22 and provide it bit serially.

Parallel processor 10 includes interconnecting circuitry interconnecting processing units 12 and 14 through 16 and edge crossing circuitry 20. As shown, lines 24 connect each processing unit to each of its adjacent processing units to interconnect the processing units into an array. In addition, line 26 connects edge processing unit 12 to receive data bit serially from edge crossing circuitry 20 and line 28 connects edge processing unit 16 to receive data bit serially from edge crossing circuitry 20. As suggested by lines 26 and 28, an item of data relating to part of a first image segment is provided bit serially to an edge processing unit that can use it to obtain another item of data relating to part of a second, adjacent image segment across an edge from the part of the first image segment.

Finally, parallel processor 10 includes control circuitry 30 connected to provide control signals to processing units 12 and 14 through 16, to data transfer circuitry 22, and to edge crossing circuitry 20. The control signals cause data transfer circuitry 22 to transfer a first item of data obtained from the processing units to edge crossing circuitry 20. The control signals also cause edge crossing circuitry 20 to provide the item of data bit serially to one of edge processing units 12 or 16 through line 26 or line 28 of the interconnecting circuitry.

FIG. 2A illustrates a relationship between items of data obtained by an array of processing units and an edge between image segments. Image segments 40 and 42 are adjacent and meet along edge 44 as shown. Image segments 40 and 42 include parts 50, 52, 54, 56, 60, and 62.

Processing units 12 and 14 through 16 in the array can perform a sequence of operations, during which each processing unit obtains items of data related to respective parts of image segments 40 and 42. As indicated, processing unit 16, numbered (p−1), can obtain items of data relating to parts 50 and 60, at the right edge of each segment, while processing unit 12, numbered zero, obtains items of data relating to parts 52 and 62, at the left edge of each segment, and so forth.

Some image processing operations, referred to herein as "neighborhood operations," use data relating to one part of an image to obtain data relating to another part of an image. The interconnecting circuitry shown in FIG. 1 can be used to transfer data between processing units to permit some neighborhood operations to be performed in parallel. For example, processing unit 12, numbered zero, can transfer data relating to part 52 to processing unit 14, numbered one, so that processing unit 14 can perform a neighborhood operation using date relating to part 52 to obtain an item of data relating to part 52. In the same way, processing unit 14 can transfer data relating to part 54 to the next processing unit in the array, and so forth to processing unit 16, numbered (p−1).

In the above example, however, processing unit 12, numbered zero, does not receive data relating to part 50 because it is at the edge of the array. Even if all the processing units are interconnected so that processing unit 16, numbered (p−1), provides an item of data to processing unit 12, numbered zero, when each of the other processing units provides an item of data to an adjacent processing unit, the item of data from processing unit 16 would relate to part 60 rather than to part 50, so that processing unit 12 would obtain an invalid result for part 52.

A neighborhood operation that uses an item of data relating to a part of a first image segment to obtain data relating to a part of a second, adjacent image segment across an edge from the part of the first image segment is referred to herein as an "edge crossing operation." In the example above, processing unit 12 could perform an edge crossing operation if it could receive data relating to part 50. In other cases, processing unit 16, numbered (p−1), could perform an edge crossing operation by using an item of data relating to part 52, part 54, or even part 60, to obtain an item of data relating to part 50. Also, processing units 12 and 14, respectively numbered zero and one, could perform edge crossing operations by using an item of data relating to part 50, part 56, or even part 62, to obtain an item of data relating to part 52 or part 54, respectively.

In FIG. 2A, all items of data used in and obtained by the edge crossing operation relate to parts of an image that lie in a single line. In addition, other edge crossing operations could use items of data relating to parts of an image in one line to obtain items of data relating to parts in another line. In other words, the term "edge crossing operation" is broad enough to cover any type of neighborhood operation that uses data relating to a part of one segment to obtain data relating to a part of another, across an edge.

One way in which edge crossing circuitry 20 can permit edge crossing operations can be understood from FIGS. 1 and 2A. Before the processing units are operated in parallel to transfer data bit serially along the array, an operation can be performed that loads data into edge crossing circuitry 20. The loaded data includes data relating to part 50, obtained from processing unit 16, and the data relating to part 50 can be loaded so that when data is transferred bit serially along the array, the data relating to part 50 is provided bit serially to processing unit 12. Therefore, processing unit 12 can obtain a valid result.

Some edge crossing; operations use data relating to interior parts of another segment, such as parts 54 and 56 in FIG. 2A, neither of which is at an edge of a segment. In these cases, the data obtained from the processing units and loaded into edge crossing circuitry 20 can include data relating to the interior parts involved. Similarly, some edge crossing operations obtain data relating to interior parts of a segment, so that data provided from edge crossing circuitry 20 can be transferred through an edge processing unit and other processing units in the array until it reaches the processing unit at which it is used. For example, in FIG. 2A, data relating to part 56 could be loaded into edge crossing circuitry 20 and could be provided to processing unit 12 which in turn transfers it to processing unit 14.

FIG. 2B shows general acts in operating parallel processor 10 to perform an edge crossing operation. The act in box 70 operates data transfer circuitry 22 to obtain a first item of data from the processing units and to transfer the first item to edge crossing circuitry 20. The act in box 72 operates edge crossing circuitry 20 to provide the first item bit serially to an edge processing unit, either processing Unit 12 or processing unit 16. The act in box 74 operates the edge-processing unit, or another processing unit that receives the first item from the edge processing unit, to use the first item to obtain a second item of data relating to a part of an image across an edge from the part to which the first item relates.

For extended edge crossing operations, the acts in FIG. 2B can be repeated. In other words, other items of data relating to interior parts of segments can be transferred to edge crossing circuitry 20 and provided to an edge processing unit as described above.

The techniques described above work especially well for extended edge crossing operations that go serially through parts of an adjacent segment rather than by random access. The operations necessary to load data relating to randomly accessed parts of a segment are more complicated.

C. General Implementation Features

The general feature described above in relation to FIGS. 1–2B could be implemented in many different Ways with a wide variety of components and with various integrated circuit technologies. The following implementation employs commercially available byte-slice integrated circuits to perform coprocessing in a Sun SPARCStation workstation.

Figure 3:
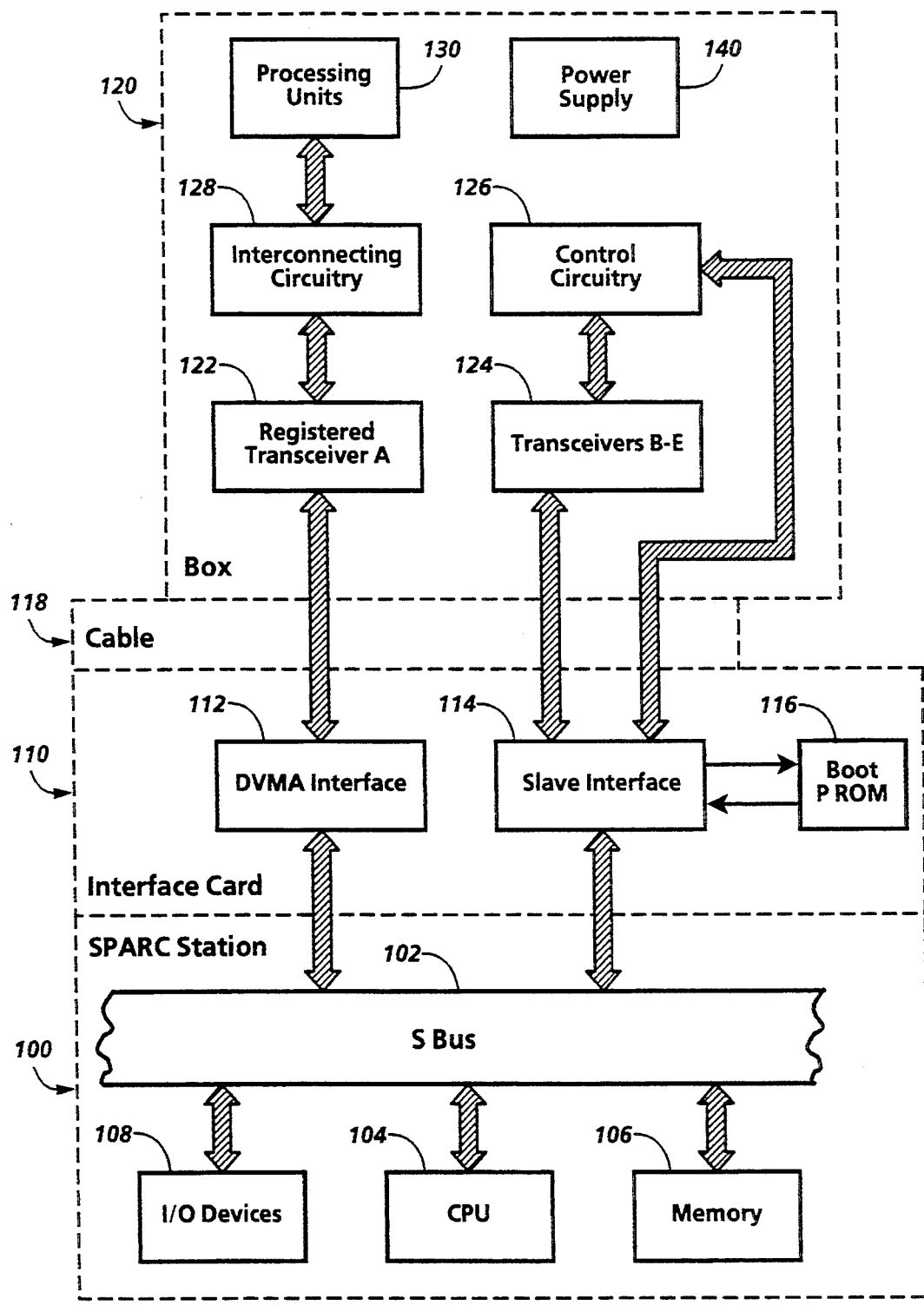
FIG. 3 is a schematic block diagram showing components in an implementation of a SIMD parallel processor connected to an SBus of a SPARCStation.
Figure 4:
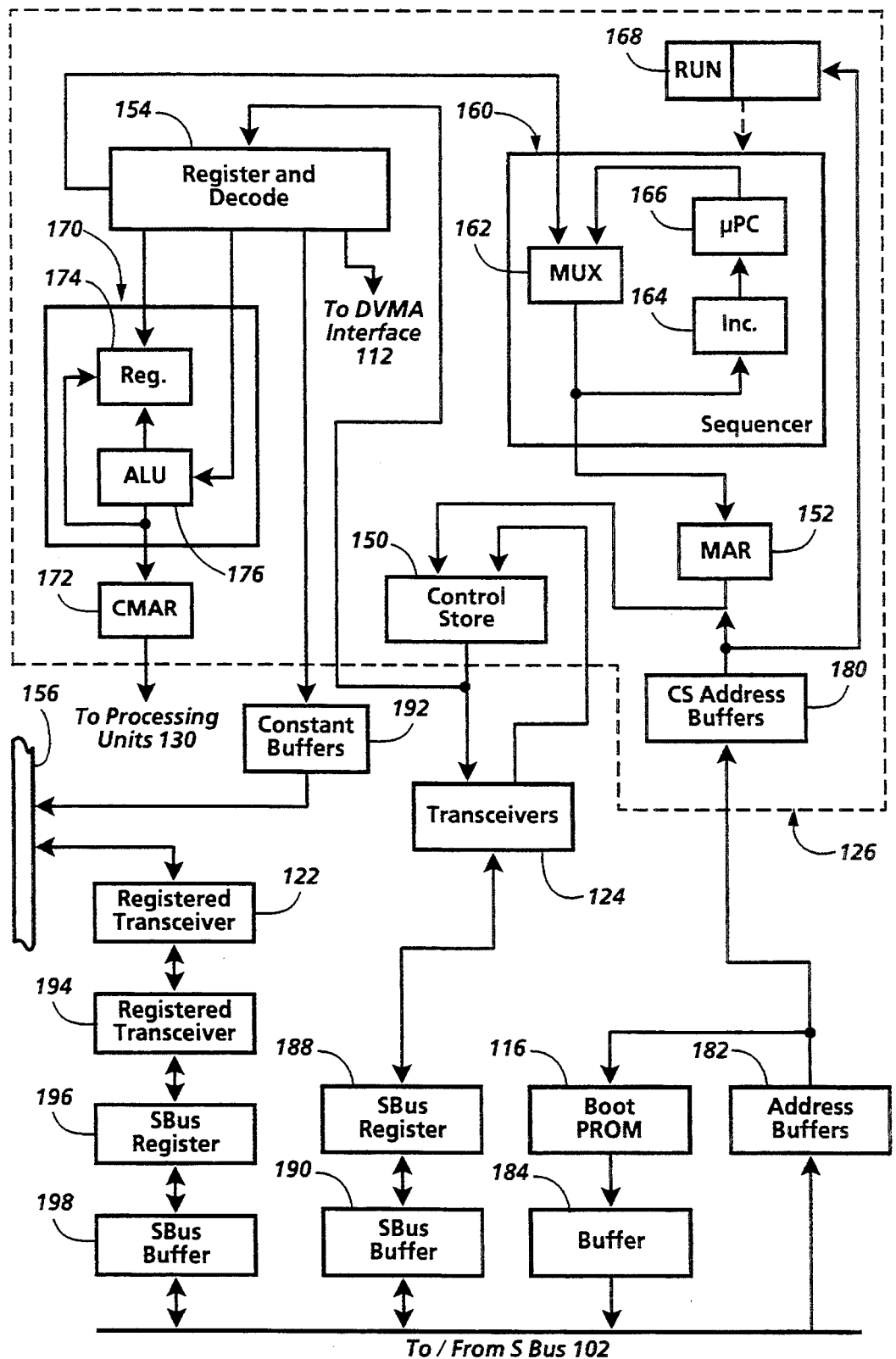
FIG. 4 is a schematic block diagram showing components of the control circuitry of FIG. 3.
Figure 5:
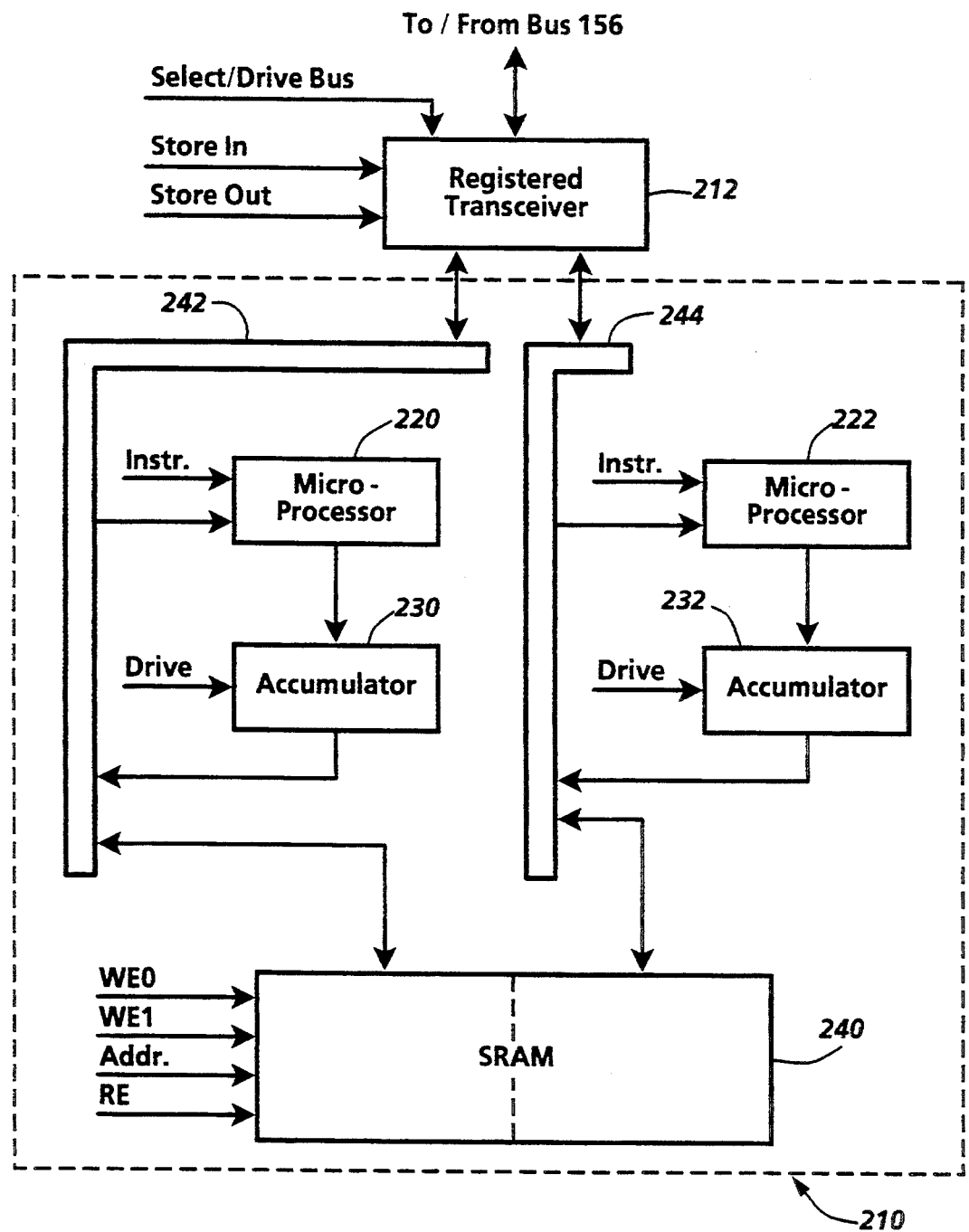
FIG. 5 is a schematic block diagram showing components of a processing unit in FIG. 3.
Figure 6:
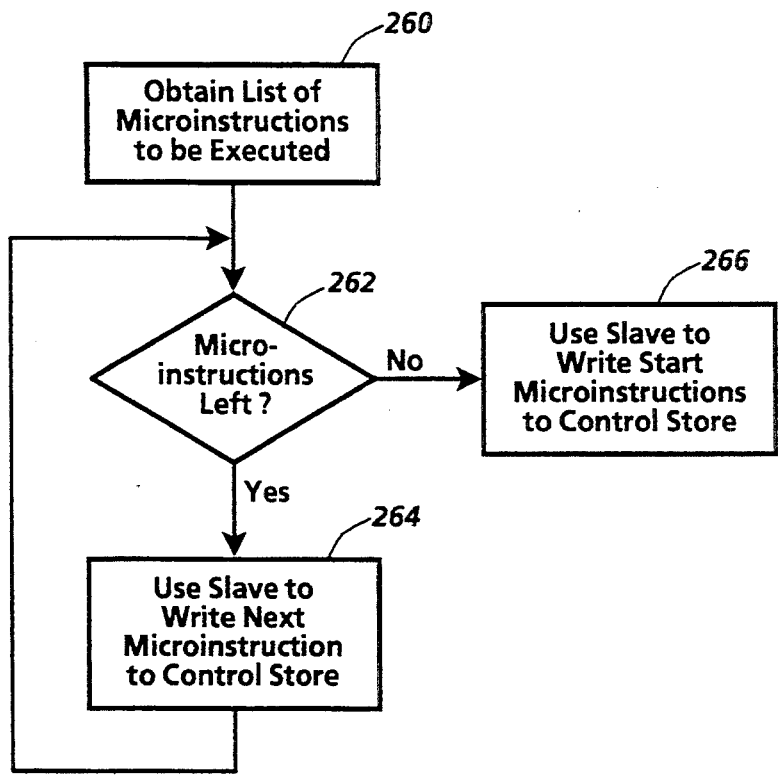
FIG. 6 is a flow chart showing general acts in loading microinstructions in a control store in FIG. 4.
Figure 7:
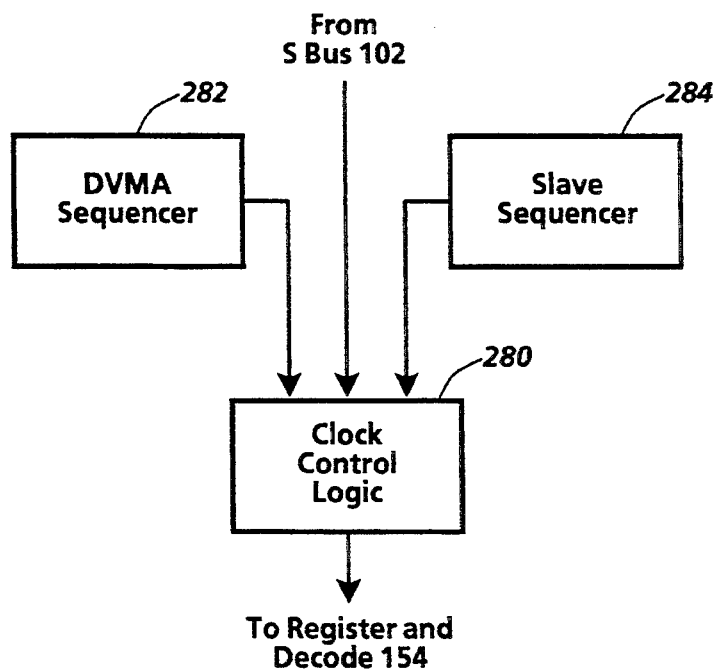
FIG. 7 is a schematic block diagram showing components that control clock signals to a box in FIG. 3.

FIG. 3 shows general components of the implementation and their connections to components in the host workstation. FIG. 4 shows components of the control circuitry in FIG. 3. FIG. 5 shows components of a processing unit in FIG. 3. FIG. 6 shows general acts in writing microinstructions to the control store in FIG. 4. FIG. 7 shows components that provide clock signals to components shown in FIGS. 4 and 5 for microinstruction execution.

FIG. 3 shows an implementation in which SPARCStation 100 serves as a host. SPARCStation 100 includes SBus 102, to which are connected central processing unit (CPU) 104, memory 106, and input/output (I/O) devices 108. Memory 106 has sufficient capacity to store image data defining several full size images, each requiring at least 1 megabyte of memory. Memory 106 can also store instruction data indicating conventional instructions CPU 104 can execute to perform operations on the image data, including compression, decompression, and other image manipulation operations. I/O devices 108 may include scanners, printers, modems, displays, disk drives, network connections, and other sources and destinations of data defining images. Mounted in SPARCStation 100 is interface card 110, a printed circuit board on which are mounted components that form direct virtual memory access (DVMA) interface 112, slave interface 114, and boot PROM 116, a programmable read-only memory component. Interface card 110 also holds conventional connectors (not shown) for mounting card 110 into SPARCStation 100 and for providing an electrical connection to SBus 102. Interface board also holds conventional connectors (not shown) to which cable 118, which may be as short as 12 inches, can be mounted to provide an electrical connection to box 120. Circuitry (not shown) formed on a surface of interface card 110 provides electrical connections between the connectors and DVMA interface 112 and slave interface 114 and between slave interface 114 and boot programmable read only memory (PROM) 116.

DVMA interface 112, a master interface, and slave interface 114 can be implemented in accordance with *SBus Specification* B.O, Sun Microsystems, Inc. Part No. 800-5922-10, 1990, which describes signal protocols for SBus master and slave interfaces. Each interface can have a respective sequencer. In addition, as described below, card 110 includes a number of components that provide signals to components in box 120 or receive signals from components in box 120, thus performing functions of DVMA interface 112 or slave interface 114.

Boot PROM 116 can be an 8K×8 bit memory accessible by slave interface 114, which is only capable of byte reads from boot PROM 116 and of single word control store accesses.

Box 120 includes a printed circuit board with conventional connectors (not shown), to which cable 118 can be mounted to provide electrical connections to DVMA interface 112 and slave interface 114. Circuitry formed on the surface of the board (not shown) provides electrical connections from the connectors to components on the board, including registered transceiver 122, transceivers 124, and control circuitry 126. Registered transceiver 122, designated A, is further connected to interconnecting circuitry 128, which interconnects processing units 130. Transceivers 124, designated B-E, are connected through parallel lines to control circuitry 126. These transceivers can be implemented with conventional 32 bit bidirectional transceivers.

Box 120 also includes power supply 140, which can be a conventional power supply capable of providing approximately 40 amps at 5 volts, or 200 watts. Box 120 also contains a cooling fan (not shown).

The arrangement shown in FIG. 3 solves several problems in using a host workstation: For a SPARCStation, the card size and constraints on space, power consumption, signal loadings, and heat dissipation make it infeasible to include an entire SIMD parallel processor on a single card; therefore, box 120 includes the processing units, control circuitry, and most of the interconnecting circuitry, and card 110 includes only a small number of components that provide a connection between box. 120 and SBus 102. In addition, dividing components into two modules in this way would allow card 110 to be replaced with an interface to another computer without significantly changing box 120. Finally, the extra space provided by box 120 facilitates debugging.

FIG. 4 shows components within control circuitry 126 and their connections to other components. In addition to the components shown, control circuitry 126 includes a conventional clock driver (not shown) for receiving and distributing the clock signal of SBus 102 at a frequency of 25 MHz, i.e. one cycle per 40 nsec, so that it can drive several components. The circuitry is designed so that control circuitry 126 can perform each possible instruction in one 40 nsec cycle. In other words, a new microinstruction and microinstruction address should be provided at each clock tick.

Control store 150 can be a 16K×128 bit static random access memory (SRAM) for storing microinstructions received from SBus 102. Upon receiving a microinstructions address from memory address register (MAR) 152, a conventional register, control store 150 provides the microinstruction to microinstruction register and decode 154. Register and decode 154 provides various control signals, including instructions to the processing circuitry of each processing unit and buffer select signals to control transfer of data on common data bus 156.

Microcode sequencer 160 loads addresses into MAR 152. Multiplexer (MUX) 162 selects either a jump address from register and decode 154 or the address that immediately follows the previous address, generated by incrementer 164 and microprogram counter ($\mu$PC) 166. Sequencer 160 can be implemented with an IDT49C410 microprogram sequencer, described in 1990/1991 *Logic Databook*, Integrated Device Technology, Inc., Santa Clara, Calif, 1990, sections 5.4 and 7.4. Sequencer 160 can receive its opcodes directly from register and decode 154.

Control/status register 168 is a conventional register whose most significant bit, called the RUN bit, indicates whether sequencer 160 should perform normal addressing or should provide a special address that holds the coprocessor. The IDT49C410 sequencer has a JumpZero instruction to which it responds by providing the address of location 0 to MAR 152. Therefore, the special address can be location 0, and the microinstruction at location 0 in control store 150 can in general be a nonoperative (no-op) instruction that is repeatedly retrieved until the microprogram is ready to execute.

The RUN bit can be cleared by the SBus reset signal when SPARCStation 100 is reset. Slave interface 114 can also read or write control/status register 168, which could include only the RUN bit. The address space addressed by CS address buffers 180 can be divided so that only the first few bits of an address are used to decode whether the address is that of control/status register 168.

As suggested by the dashed line from control/status register 168 to sequencer 160, the RUN bit is not provided directly to sequencer 160, but is received by register and decode 154, which then responds appropriately. While the RUN bit is set, register and decode 154 receives in each cycle a microinstruction fetched from control store 150 and, in the next cycle, decodes the microinstruction and executes it by providing control signals to other components. Upon detecting that the RUN bit has been cleared, however, register and decode 154 provides a JumpZero instruction to sequencer 160 and ignores whatever microinstruction has been fetched in the previous cycle.

After a microprogram has been stored in control store 150, execution of the microprogram can be caused by writing a microinstruction to location 0 that, when executed, provides the starting address of the microprogram to sequencer 160 and again sets the RUN bit so that sequencer 160 can begin normal addressing. Since the microinstruction from location 0 is fetched from control store 150 twice before the first instruction of the microprogram is fetched, every microprogram should begin with a no-op instruction that provides a "Continue" opcode to sequencer 160. This causes incrementer 164 to increment the address in $\mu$PC 166, beginning normal address incrementing.

The final operation of each microprogram can write a completion code to a location in SPARCStation memory, and whenever the SPARCStation sees the completion code, it can clear the RUN bit. Until the RUN bit is cleared, the microprogram can perform a no-op loop or, alternatively, the microprogram itself could clear the RUN bit after writing the completion code. Address processor 170 loads addresses into cache memory address register (CMAR) 172, connected to provide an address to each processing unit. The previous address provided to CMAR 172 can be stored in register 174. Alternatively, an address from register and decode 154 can be loaded directly into register 174. ALU 176 can then operate on the value in register 174 to obtain the next address. Address processor 170 can be implemented with an IDT49C402B microprocessor, described in 1990/1991 *Logic Databook*, Integrated Device Technology, Inc., Santa Clara, Calif., 1990, sections 5.3 and 7.2. Register 174 can be the Q register or any of the other internal registers of address processor 170. Register and decode 154 can provide instructions, register specifiers, a carry signal, and addresses to address processor 170, and can also provide a write enable signal to the memory circuitry of one or more processing units.

Control store address buffers 180 are connected to receive addresses from address buffers 182 in slave interface 114 on interface card 110. This provides a path through which CPU 104 in SPARCStation 100 can provide an address to control store 150. Also, SBus 102 can provides two address bits through this path that are hardwired to logic that write enables 32 bits of SRAM or one 32 bit bank of SRAM at a time, since only one 32 bit word at a time can be received from SBus 102. Each of transceivers 124 is connected to provide 32 bits to SBus register 188 on interface card 110, which in turn can provide data to SBus buffer 190, all of which can be implemented with conventional 32 bit components. This circuitry provides a path through which one 32 bit segment at a time of a 128 bit microinstruction in control store 150 can be read to SBus 102, one of the functions of slave interface 114.

Transceivers 124 are also connected to receive data from SBus register 188, which in turn receives data from SBus 102 through SBus buffer 190. Therefore, this circuitry also provides a path through which a microinstruction flora SBus 102 can be loaded into control store 150, another function of slave interface 114.

In addition to providing addresses for control store 150 and for control/status register 168, address, buffers 182 also provide addresses to boot PROM 116. Boot PROM 116 is read at boot time to identify card 110. Therefore, it begins at address 0 relative to its SBus slot. Boot PROM 116 stores data that indicates FCode instructions that can be executed by CPU 104 during boot to obtain data indicating an identifier of card 110, including what kind of card it is and which revision; indicating address space parameters; and indicating what driver should be loaded to communicate with card 110. These instructions can be written according to conventional techniques using the instructions set forth in *SBus Specification* B.O, Sun Microsystems, Inc. Part No. 800-5922-10, 1990, Appendix C, pp. 143–168, entitled "FCode Reference." Each instruction from boot PROM 116 is provided to SBus 102 through buffer 184.

Boot PROM 116 is read using byte accesses. If CPU 104 tries to read a 32 bit word during boot time, slave interface 112 responds by returning a byte response on Ack[2:0], causing CPU 104 to read one byte at a time. Boot PROM 116 drives only the most significant byte of the SBus data line.

FIG. 4 also shows constant buffers 192, a set of buffers through which register and decode 154 can provide data to common data bus 156. Common data bus 156 is also connected to processing units 130 and is therefore a part of interconnecting circuitry 128 in FIG. 3.

As shown, common data bus 156 is also connected to receive data from SBus 102 and provide data to SBus 102 through registered transceiver 122, designated A in FIG. 3. Transceiver 122 is connected to provide 32 bits to registered transceiver 194 on interface card 110, which in turn can provide data to SBus register 196 and SBus buffer 198, all of which can be implemented with conventional 32 bit components. This circuitry provides a path through which an item of data can be transferred from a processing unit to SBus 102, one of the functions of DVMA interface 112.

Transceiver 122 is also connected to receive data from registered transceiver 194, which in turn receives data from SBus 102 through SBus register 196 and SBus buffer 198. Therefore, this circuitry also provides a path through which an item of data can be transferred from SBus 102 to a set of processing units, another function of DVMA interface 112.

Register and decode 154 is also connected to provide some control signals directly to DVMA interface 112 on card 110. As a result, a microinstruction can provide signals to DVMA interface 112 so that it acts as a master on SBus 102.

FIG. 5 shows processing unit 210, the pth one of processing units 130, together with respective registered transceiver 212. Registered transceiver 212 provides a connection through which processing unit 210 receives data from common data bus 156 and provides data to common data bus 156. Therefore, registered transceiver 212 is a part of interconnecting circuitry 128 in FIG. 3. Registered transceiver 212 can be implemented with a 32 bit set of conventional registered transceivers, such as four 8 bit 74FCT651 transceivers from Integrated Device Technology, Inc., or any equivalent circuitry, such as two 16 bit transceivers. Registered transceiver 212 responds to signals from register and decode 154 by storing data from bus 156; by storing data from buses 242 and 244; by driving bus 156; or by driving buses 242 and 244.

Processing unit 210 includes microprocessors 220 and 222, each of which can be implemented with an IDT49C402B microprocessor, described in 1990/1991 *Logic Databook*, Integrated Device Technology, Inc., Santa Clara, Calif., 1990, sections 5.3 and 7.2. In this implementation, each microprocessor includes an arithmetic logic unit (ALU), a Q register, a 64-register bank, and internal shift logic so that registers can be cascaded to form very long shift registers. An array of P processing units, each with two 16 bit microprocessors, can thus load, store, or operate on 32*P bits per clock cycle. All the microprocessors can receive signals indicating instructions in parallel from register and decode 154.

Accumulators (ACC) 230 and 232 are connected to receive data output by microprocessors 220 and 222, respectively. Accumulators 230 and 232 are necessary because microprocessors 220 and 222 do not produce cache write data quickly enough. In addition, accumulators 230 and 232 make it possible to perform an operation while shifting a microprocessor's Q register, because the output from each microprocessor's ALU can be stored in its accumulator and then fed back to the microprocessor's data input during the next cycle. Each accumulator can be implemented with a conventional 16 bit register with tri-state outputs. The accumulators are controlled in parallel by signals from register and decode 154 indicating whether to provide output.

Processing unit 210 also includes static RAM (SRAM) 240, a 64K×32 bit memory, connected through internal buses 242 and 244 so that 16 bits of each data unit are accessible by microprocessor 220 and the other 16 bits are accessible by microprocessor 222. SRAM 240 can be implemented with a Motorola MCM3264 module. An array of P processing units, each with one such memory module, can thus store a total of P*2M bits of data. SRAM 240 and each of the other memory modules receives addresses in parallel from CMAR 172, and each memory module also receives write enable signals and read enable signals from register and decode 154. Signals from register and decode 154 can write enable or read enable both halves of a data unit, and separate signals can also indicate write enables to each half of each data unit. SRAM 240 can be managed as a cache memory.

As shown, internal buses 242 and 244 are each connected to registered transceiver 212 and to SRAM 240. In addition, bus 242 is connected to receive data from accumulator 230 and to provide data to processor 220, while bus 244 is connected to received from accumulator 232 and to provide to processor 222. Data transfer on internal buses 242 and 244 is controlled by signals from register and decode 154 to registered transceiver 212, to accumulators 230 and 232, and to SRAM 240 indicating which source should drive the buses. The signal to SRAM 240 is a read enable signal as mentioned above.

Data can be transferred from SBus 102 to either of microprocessors 220 and 222 by first writing the data into SRAM 240 through the respective internal bus 242 or 244. Then the data is read onto the respective internal bus 242 or 244 and the microprocessor executes an instruction causing it to read data from the internal bus. Rather than following this path, data could be provided more directly to each microprocessor. For example, register and decode 154 could be connected to a separate transfer enable line for each microprocessor, so that data from bus 102 could be written directly to each microprocessor.

If SRAM 240 is implemented with a dual port memory component, rather than a single port component as shown, microprocessors 220 and 222 can be connected to one memory port and registered transceiver 212 can be connected to the other. Write accesses from the microprocessors and from registered transceiver 212 can be synchronized to prevent collisions. Register and decode 154 includes logic that produces control signals in response to microinstructions from control store 150 according to conventional techniques. The microinstructions could be encoded in a wide variety of ways. For example, each microinstruction could include a three bit field indicating a source to drive bus 156; a two bit field indicating a source to drive buses 242 and 244; a six bit field indicating which SRAMs are write enabled; a ten bit field indicating an instruction for the microprocessors; two six bit fields indicating microprocessor A register and B register, respectively; a two bit field to set microprocessor carry inputs; a ten bit field indicating an instruction for address processor 170; two six bit fields indicating A register and B register, respectively, in address processor 170; a four bit field indicating an instruction for sequencer 160; a two bit field that selects a source for a single bit that controls whether a branch is taken; a single bit field indicating loading of μPC 166 in sequencer 160; a single bit field indicating the carry in of sequencer 160; a single bit field indicating the carry in of address processor 170; and a sixteen bit field indicating a constant for sequencer 160, address processor 170, or the microprocessors.

In FIG. 6, the act in box 260 obtains a list of microinstructions to be executed. Host CPU 104 can, for example, obtain a list by retrieving a list from memory 106 or by executing instructions that produce a list.

The act in box 262 begins an iterative operation that loads each microinstruction into control store 150. During the act in box 264 for each iteration, slave interface 114 writes a microinstruction into control store 150. Host CPU 104 can, for example, provide an address to address buffers 182 and a series of four 32 bit microinstruction segments to SBus buffer 190, together with signals to a sequencer in slave interface 114 requesting each 32 bit microinstruction segment be loaded at the address.

In response to the request, slave interface 114 can provide control signals to transfer each microinstruction segment in the series to SBus register 188 and to a respective one of transceivers 124. Each microinstruction is received in four 32 bit segments, and each 32 bit segment is written to control store 150 as it is received. Slave interface 114 can also provide control signals to transfer the address to CS address buffers 180 and to control the output from MAR 152 so that the address in CS address buffers 180 is presented at the address port of control store 150. Slave interface 114 can also provide signals to write enable 32 bits of SRAM in control store 150. Then, slave interface 114 can provide a write signal to control store 150 so that a 32 bit segment of the microinstruction is written into the write enabled 32 bits at the address in CS address buffers 180.

A special start sequence of microinstructions can be written into an appropriate location in control store to start execution of a list of microinstructions. Therefore, when the list is completely written into the control store, the act in box 266 is performed, during which slave interface 114 writes the start sequence.

When the RUN bit is clear, as described above, sequencer 160 can repeatedly receive a JumpZero instruction, so that it repeatedly fetches a no-op microinstruction at location 0. The start sequence can therefore be written by writing a JUMP-to-location-n microinstruction to location 0, where n is the starting location of the microinstructions to be executed next. Subsequently, the RUN bit can be set by slave interface 114 in response to the current SBus master.

Due to pipelining, each JUMP microinstruction affects two cycles, the first to obtain and latch the address of the next microinstruction into MAR 152 and the second to fetch the microinstruction at the address in MAR 152. Therefore, the address in MAR 152 is that of location 0 until the JUMP-to-location-n microinstruction is executed, and as a result of the preceding JUMP-to-location-0 microinstruction, the JUMP-to-location-n microinstruction is again fetched from location 0.

Because the JUMP-to-location-n microinstruction is fetched twice, it is executed twice. Each time it is executed, the microinstruction at location n is fetched. Therefore, the microinstruction at location n is also executed twice, and it can be a processor no-op that provides a "Continue" opcode to sequencer 160, causing sequencer 160 to start incrementing the address so that the microinstruction at location n+1 is fetched, and so forth.

Before the act in box 260 and after the act in box 266, host CPU 104 can perform any of a wide variety of activities. For example, if host CPU 104 is managing a queue of lists of microinstructions, each to be loaded to control store 150 in the manner shown in FIG. 6, CPU 104 can maintain the queue and perform any operations necessary to obtain subsequent lists on the queue. CPU 104 can also perform operations to determine whether the next list on the queue is already loaded into control store 150, in which case it need not be loaded again, but can be called by loading a JUMP-to-location-n microinstruction as in the act in box 266. Host CPU 104 can perform multitasking, in which case it can perform other tasks after loading a list of microinstructions. Or it could wait for execution of the list to be completed or for an interrupt from the coprocessor.

FIG. 7 illustrates components that control clock signals so that a microinstruction can be loaded into control store 150 without interfering with execution of a previous microinstruction. Clock control logic 280 on card 110 receives clock signals from SBus 102, as do other components on card 110 including DVMA sequencer 282, slave sequencer 284, and SBus register 188. Clock control logic 180 always provides a clock signal to components in box 120, unless it receives a signal from DVMA sequencer 282 or from slave sequencer 284 indicating clock signals should not be provided to box 120. For example, whenever slave sequencer 284 is providing control signals to load a microinstruction into control store 150, it provides a signal to clock control logic 180 to prevent clock signals. In general, DVMA sequencer 282 stops clock signals when DVMA sequencer 282 either is attempting to gain control of SBus 102 as indicated by a Bus Grant signal from an SBus arbiter or is awaiting a signal from slave sequencer 284 on the SBus Ack[2:0] lines.

Each clock signal from clock control logic 280 goes to register and decode 154 and can also go directly or via register and decode 154 to any other component in box 120 that requires a clock signal. Register and decode 154 responds to a clock signal by decoding a microinstruction read from control store 150. Other components that include registers must also receive clock signals. For example, in the implementation of FIGS. 4 and 5, sequencer 160, address decoder 170 and microprocessors 220 and 222 must receive clock signals because of their internal registers. Similarly, registered transceivers 122, 194, and 212; MAR 152; CMAR 172; SBus registers 188 and 196; and accumulators 230 and 232 must receive clock signals although, as noted above, SBus register 188 can receive clock signals directly from SBus 102. Some other components may be implemented to require clock signals, such as control store 150 and SRAM 240; these components may also be implemented so that no clock signal is required, but with register and decode 154 providing read enable and write enable signals. A sequence of several clock signals may all involve a single microinstruction, from obtaining its address to storing data in SRAM 240 in response to its execution.

In addition to the general implementation features above, a number of features specific to this invention are set forth below.

D. General Application Features

The general implementation features described above could be used in a wide variety of data processing applications. They are expected to be particularly useful, however, in performing some types of image processing more rapidly than they could be performed on a serial processor. In particular, the features described above could be used to implement techniques similar to those described in Serra, J., *Image Analysis and Mathematical Morphology*, Academic Press, 1982 and Serra, J., *Image Analysis and Mathematical Morphology, Volume 2: Theoretical Advances*, Academic Press, 1988. Such techniques may be used, for example, to provide document services, such as removal of noise or other non-informative features, skew correction, data encoding, extraction of segments for automatic form or control sheet creation, and printer specific correction. Such document services can be used in digital copying machines, including fax machines and photocopying machines, in machines that produce data defining an image for a printer or other image output device, in machines that operate on data defining an image received from a scanner or other image input device, and in other machines that perform image processing.

The features described above can be used to perform edge crossing operations during a wide variety of image processing operations.

As shown in this application and the other applications incorporated herein by reference, the implementation described above provides a one-dimensional SIMD array of processing units. Each processing unit can perform operations for one or more full height columns of pixels from an image.

The general implementation features described above may also be useful in various other applications, such as searching an image database for images containing a particular set of features; scanning envelopes for addresses; interpreting forms from a high-speed scanner; machine vision; and process-specific print image correction and verification.

E. Specific Implementation Features

Figure 8:
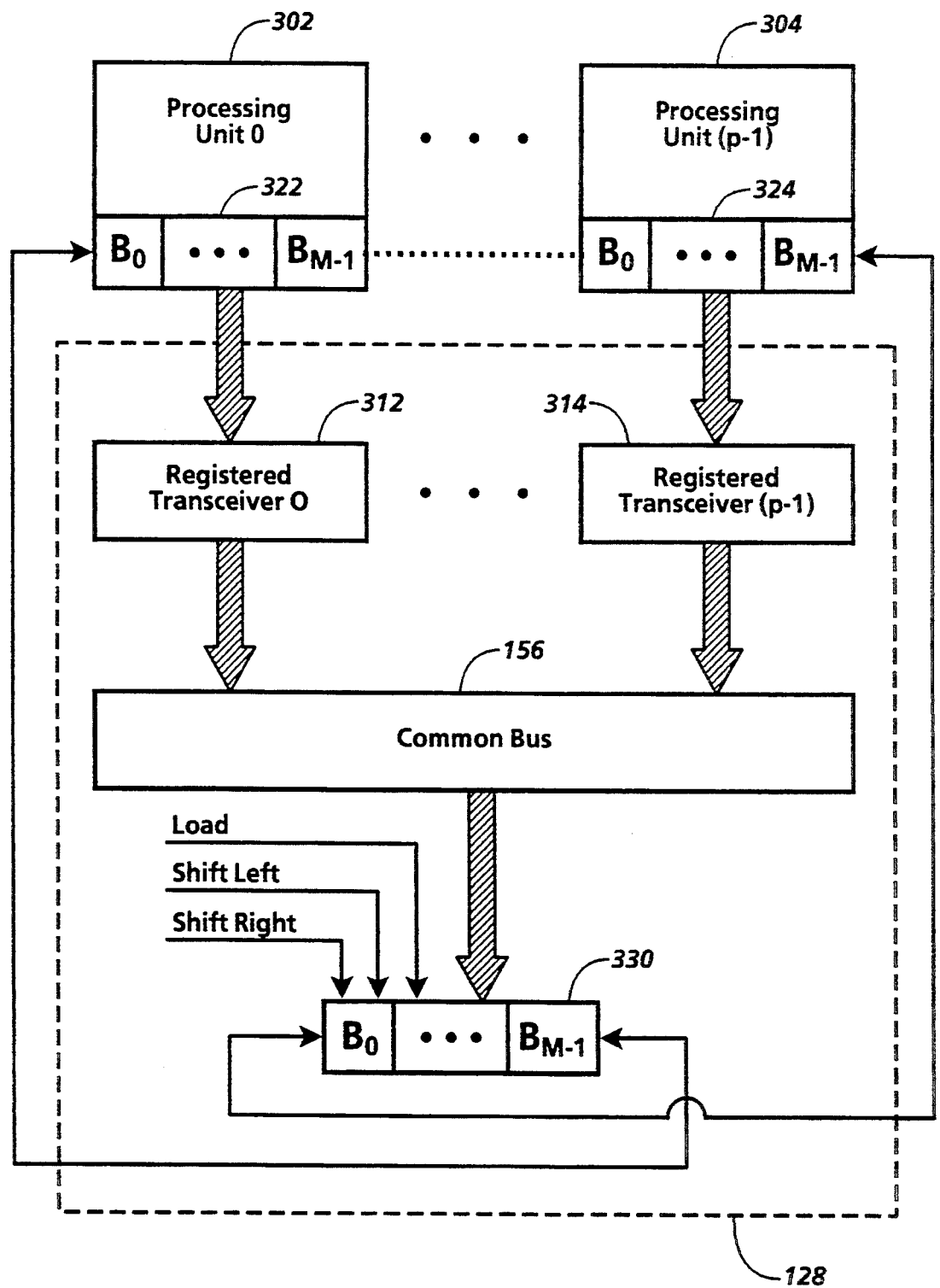
FIG. 8 is a schematic block diagram showing components within interconnecting circuitry 128 that can be used in an edge crossing operation.
Figure 9:
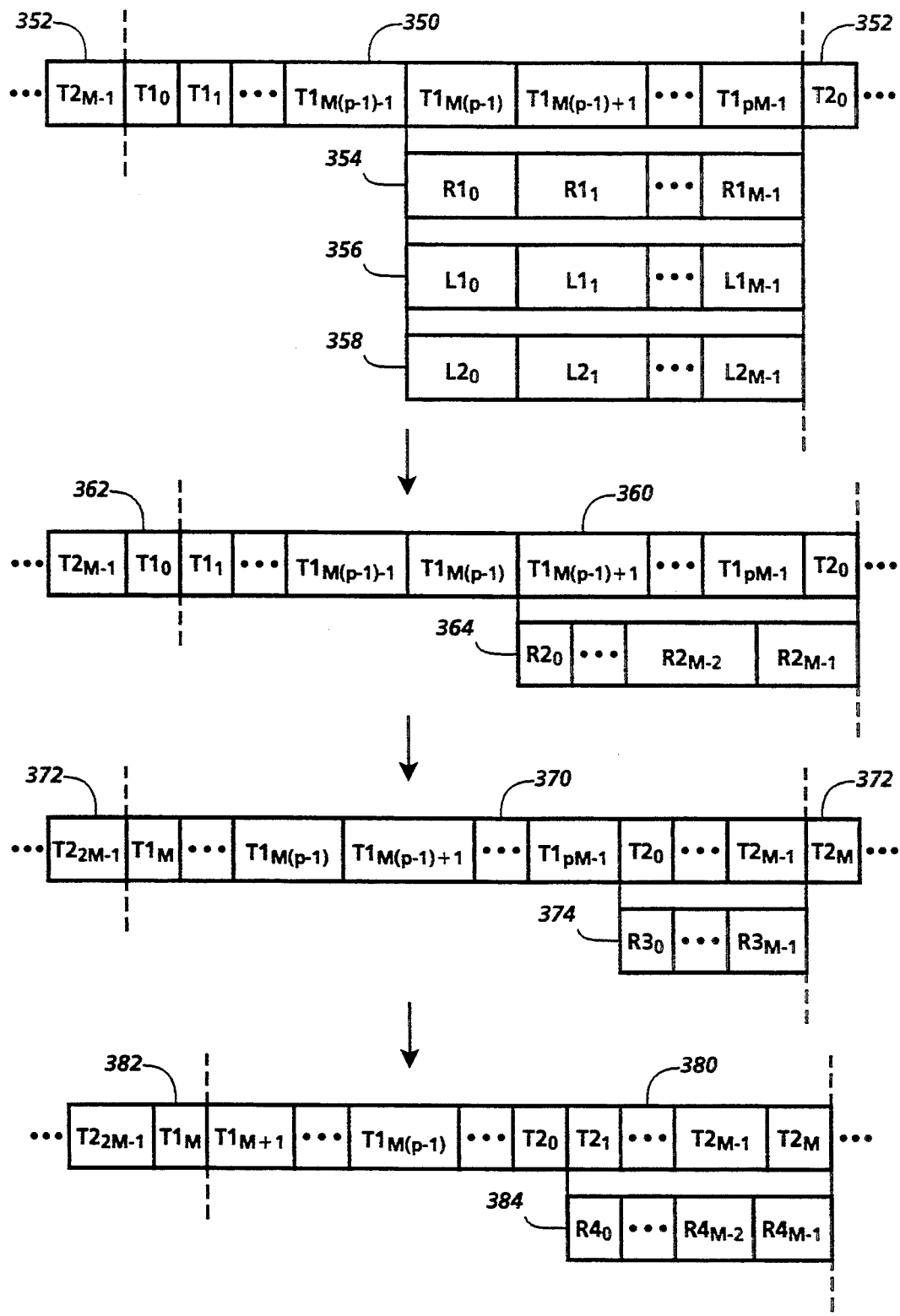
FIG. 9 is a schematic flow diagram showing how data is shifted within the component in FIG. 8 during an edge crossing operation.
Figure 12:
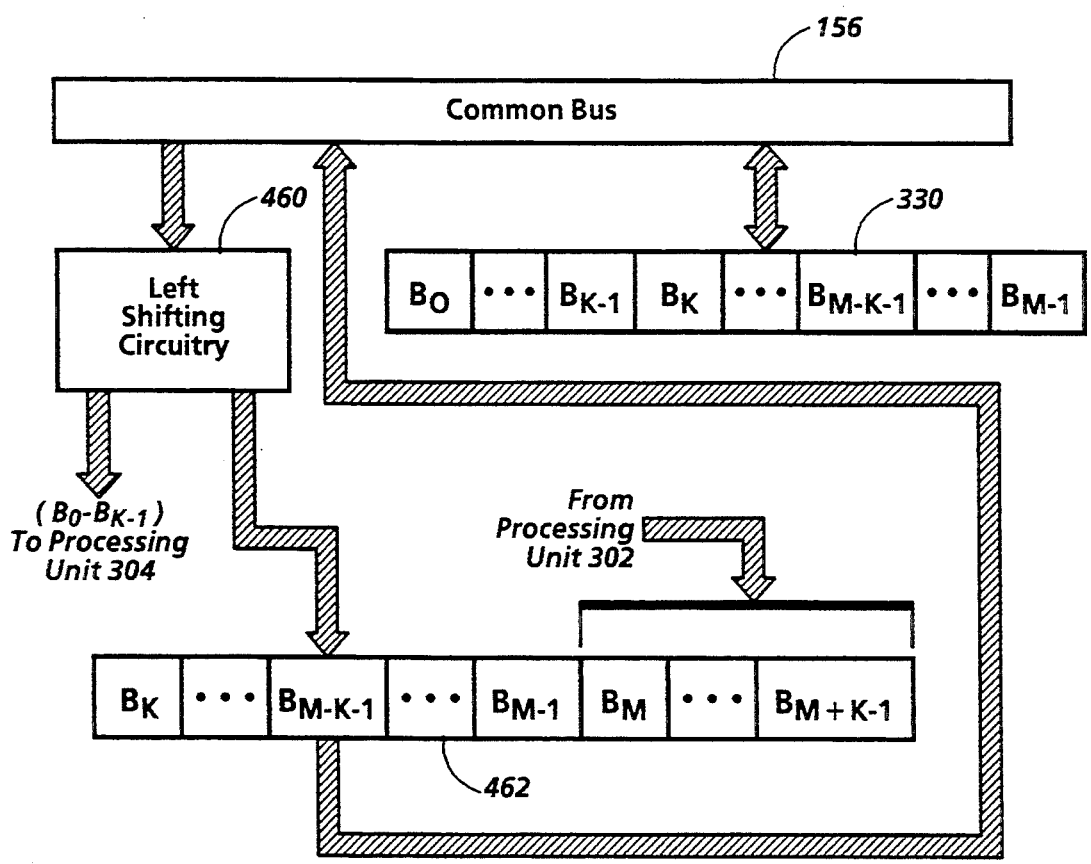
FIG. 12 is a schematic block diagram showing circuitry for leftward K-bit shifting.
Figure 13:
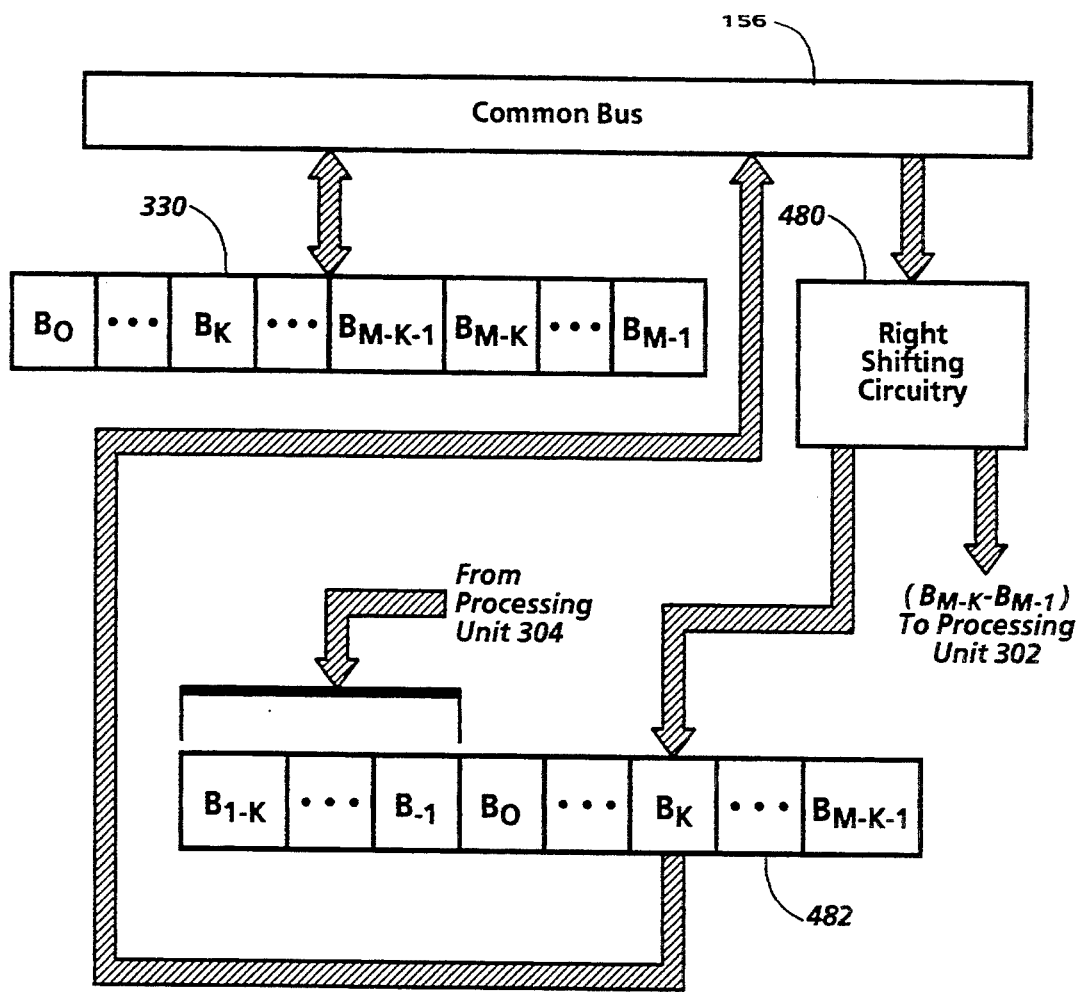
FIG. 13 is a schematic block diagram showing circuitry for rightward K-bit shifting.
Figure 14:
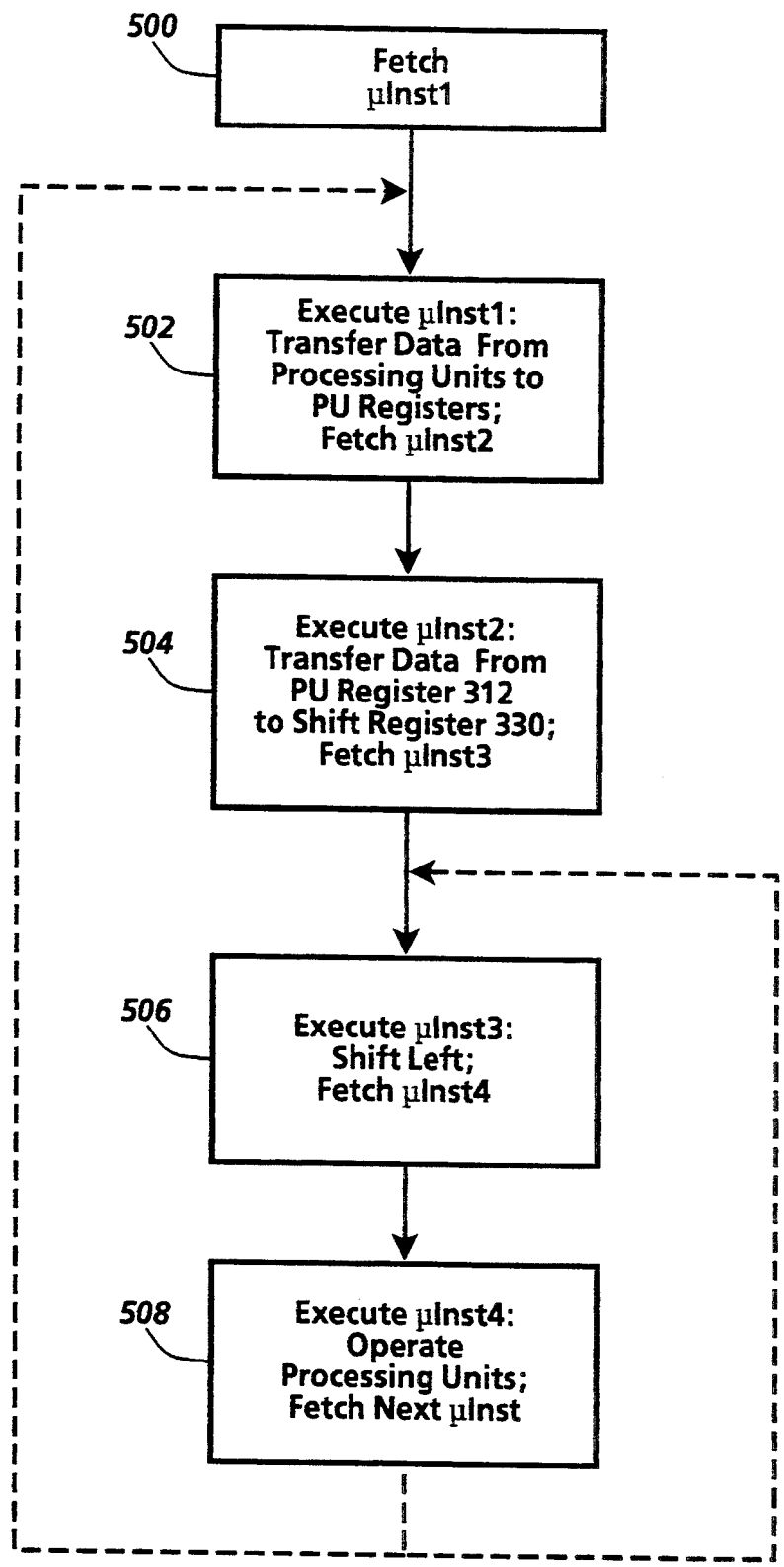
FIG. 14 is a flow chart showing clock cycles in executing microinstructions for shifting left.
Figure 15:
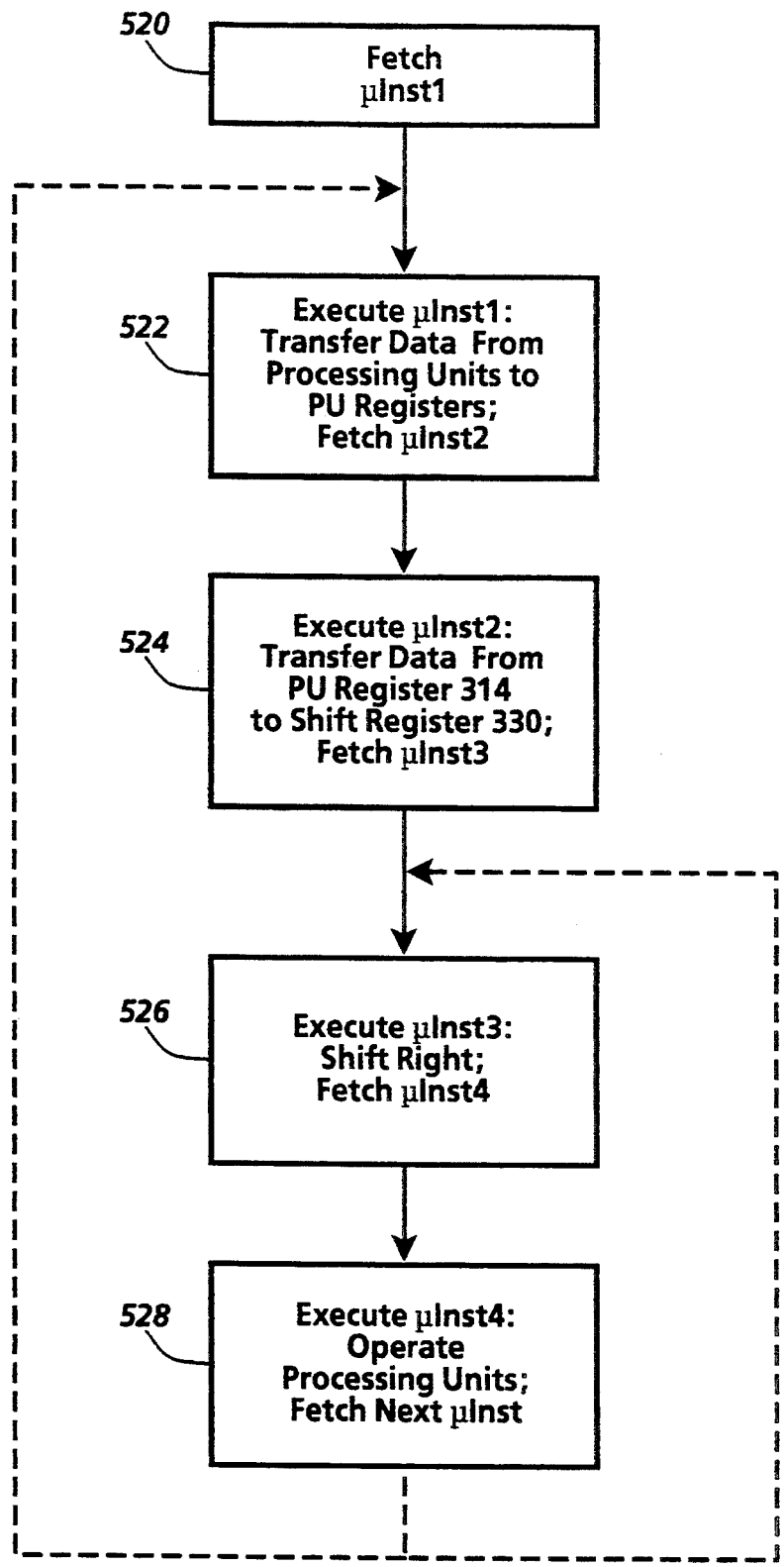
FIG. 15 is a flow chart showing clock cycles in executing microinstructions for shifting right.

FIGS. 8–18 show how the general implementation features described above could be used to implement the invention. FIGS. 8–9 show features of interconnecting circuitry that includes a shift register for use in edge crossing operations. FIGS. 10–13 show features for edge crossing operations with multi-bit pixels. FIGS. 14 and 15 show acts performed in executing sequences of microinstructions to perform leftward edge crossing and rightward edge crossing operations.

1. Shift Register

FIG. 8 shows an implementation of interconnecting circuitry 128 in FIG. 3 in which a shift register can provide data bit serially to edge processing units.

FIG. 9 shows a sequence of stored data occurring during an edge crossing operation.

FIG. 8 shows processing units 302 and 304, the first and last of an array that includes p processing units. Interconnecting circuitry 128 includes registered transceivers 312 through 314, one for each processing unit. The processing units and the respective registered transceivers can be implemented as described above in relation to FIG. 5.

Each of processing units 302 through 304 includes a shift register, as shown by shift register 322 in processing unit 302 and shift register 324 in processing unit 304. Each shift register can store an M-bit word, with the bit positions illustratively designated $B_0$ through $B_{(M-1)}$. As indicated by the dotted line, the shift registers of all the processing units are connected to form an array-wide shift register that extends through all the processing units. The array-wide shift register includes $p \times M$ bits and can be shifted bit serially leftward toward processing unit 302 or rightward toward processing unit 304 to transfer data during neighborhood operations.

Each of processing units 302 through 304 can provide an M-bit word in parallel through the respective registered transceiver to common bus 156, which can in turn provide the M-bit word to edge crossing shift register 330. The connections between registered transceivers 312 through 314 and common bus 156 can include additional circuitry such as the buses and transceivers described in copending coassigned U.S. patent application Ser. No. 07/993,939, entitled "Subsampling and Spreading Circuitry for SIMD Architecture," incorporated herein by reference.

In response to a load signal, edge crossing shift register 330 loads an M-bit word in parallel from common bus 156. In response to shift left and shift right signals, edge crossing shift register 330 then operates as part of the array-wide shift register formed by shift registers 322 through 324. A shift left signal causes edge crossing shift register 330 to provide data bit serially to processing unit 304, beginning with the bit designated $B_0$. A shift right signal causes edge crossing shift register 330 to provide data bit serially to processing unit 302, beginning with the bit designated $B_{(M-1)}$.

Edge crossing shift register 330 can be implemented with a conventional 32 bit shift register. As discussed below, the conventional shift register can be modified to facilitate operations on multi-bit pixels. In addition, edge crossing shift register can be structured to provide data to common bus 156 and to operate as a holding register in the manner described in copending coassigned U.S. patent application Ser. Nos. 07/993,939, entitled "Subsampling and Spreading Circuitry for SIMD Architecture"; 07/994,490, entitled "One Dimensional SIMD System with Buffers for Performing Orthogonal Rotations"; 07/993,219, "SIMD Architecture with Bas for Transferring Data to and from Processing Units," all incorporated herein by reference.

FIG. 9 shows a sequence of data stored in several of the components in FIG. 8 at four stages in an edge crossing operation. The components include the array-wide shift register formed by shift registers 322 through 324; edge crossing shift register 330; and processing unit 304, which can include registers and memory circuitry.

In the first stage, data item 350 is stored in the array-wide shift register; data item 352 is stored in edge crossing shift register 330; and data items 354, 356, and 358 are stored in processing unit 304. Data item 350 includes $p \times M$ bits, $T1_0$ through $T1_{pM-1}$, which together define a line of a segment or tile of an image, such as segment 40 in FIG. 2A. Data item 352 includes M bits, $T2_0$ through $T2_{M-1}$, the first M bits to the right of data item 350, on the same line but across an edge in an adjacent segment. Data item 354 is an M-bit previous result, $R1_0$ through $R1_{M-1}$, stored in processing unit 304, such as in registers in microprocessor 220 and 222 in FIG. 5. Data items 356 and 358 are two M-bit words, $L1_0$ through $L1_{M-1}$ and $L2_0$ through $L2_{M-1}$, both stored in processing unit 304, such as in SRAM 240 in FIG. 5.

Data items 356 and 358 can be source data defining part of a line in a segment of an image, and can remain unmodified during the edge crossing operation. Before the first stage in FIG. 9, an entire line in a segment of an image could have been loaded from processing units 302 through 304 into the array-wide shift register, so that one of data items 356 and 358 could be the same as the last M-bits of data item 350, $T1_{M(p-1)}$ through $T1_{pM-1}$. Data item 352 could have been loaded into edge crossing shift register 330 from processing unit 302, which similarly stores parts of lines in segments of the image. Data item 354 could have been obtained by operating processing units 302 through 304 in parallel to perform an operation, such as a logical operation on the lines that include data items 356 and 358.

In order to perform the edge crossing operation, processing unit 304 requires data from across the edge. In order to obtain this data, one or more shift operations are performed, one of which is illustrated in the second stage in FIG. 9. In the second stage, data item 360 is in the array-wide shift register, data item 362 is in edge crossing shift register 330, and data item 364 is an intermediate result in processing unit 304. The shift operation is performed by left shifting edge crossing shift register 330 at the same time that processing units 302 through 304 are operated to shift registers 322 through 324 to the left. As a result, data item 360 includes $T2_0$ at its right edge, and data item 362 include $T1_0$ at its right edge.

After the second stage in FIG. 9, further shift operations could be performed, both to the right and to the left, provided that none of the operations modifies the contents of the array-wide shift register and provided that $T1_0$ is not shifted into the right edge of the array-wide shift register and $T2_{M-1}$ is not shifted into the left edge of the array-wide shift register.

In the third stage in FIG. 9, data item 370 has been shifted as far as possible to the left, so that $T2_{M-1}$ has reached the right edge of the array-wide shift register, so that no further left shifting would have been possible. To permit further shifting to the left, a new M-bit word, data item 372 including $T2_M$ through $T2_{2M-1}$, can be loaded into edge crossing shift register 330 to allow further shifting to the left if necessary. Data item 372 can be loaded from the processing unit numbered one. Again, data item 374 is an intermediate result of the edge crossing operation, stored in processing unit 304.

In the fourth stage in FIG. 9, a further left shifting operation has been performed, leaving data item 380 in the array-wide shift register and data item 382 in edge crossing shift register 330. Data item 384 is an intermediate result stored in processing unit 304.

The technique illustrated in FIG. 9 could similarly be applied to rightward shifting, with data being loaded into edge crossing shift register 330 from across an edge to the left of the segment. The technique illustrated in FIG. 9 could be applied to using data defining one line of an input image to obtain a different line of an output image. Furthermore, the technique illustrated in FIG. 9 can be applied to binary pixels or to multi-bit pixels, as discussed in further detail below.

2. Multi-bit Pixels

The technique illustrated in FIG. 9 requires one clock cycle for each shift operation. If each pixel includes K bits, where K>1, the technique of FIG. 9 would require K clock cycles to shift one pixel from edge crossing shift register 330 into the array-wide shift register. The invention can be implemented with special circuitry for K-bit shifting.

Figure 10:
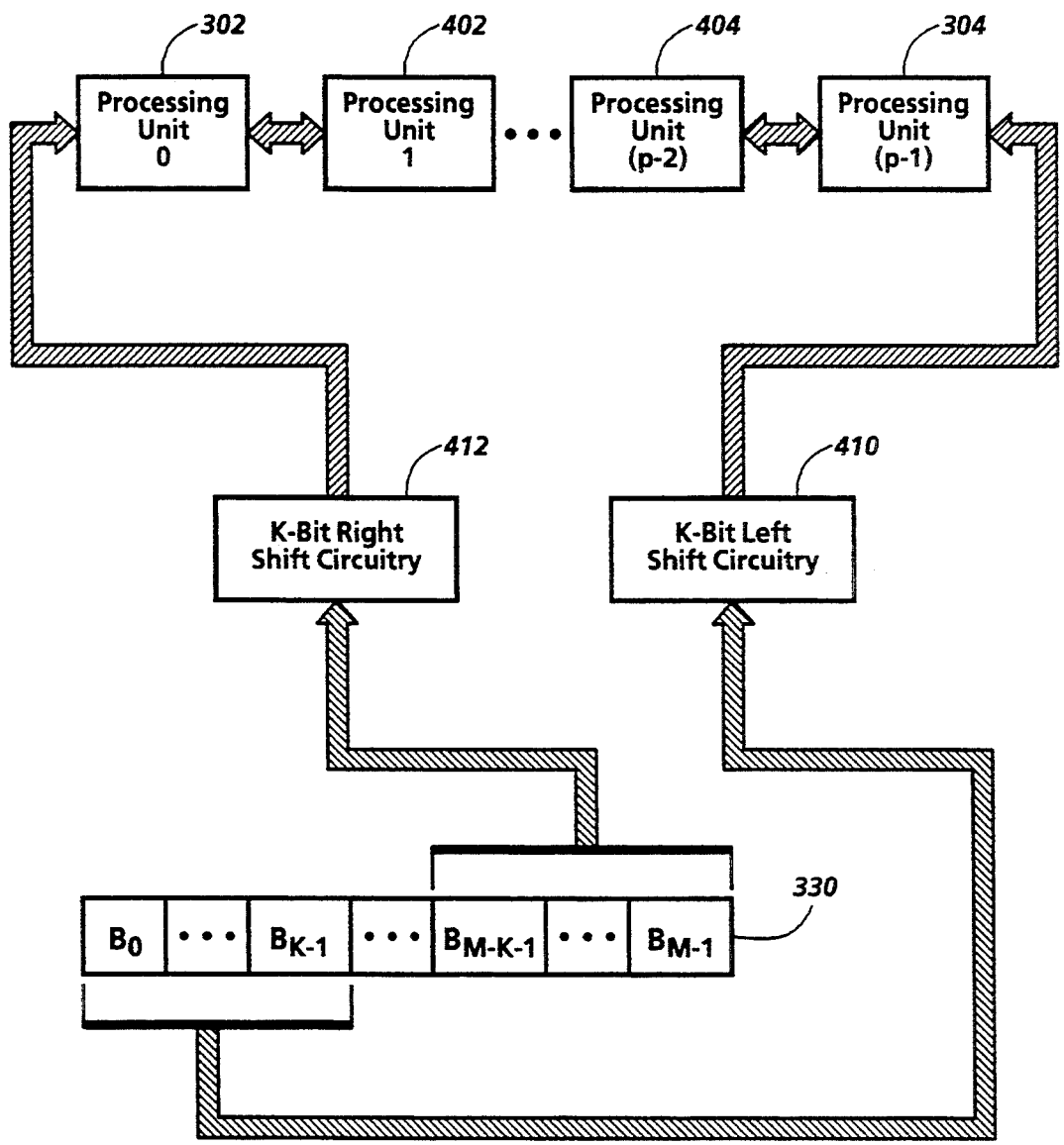
FIG. 10 is a schematic block diagram showing components used during multi-bit shifting.
Figure 11:
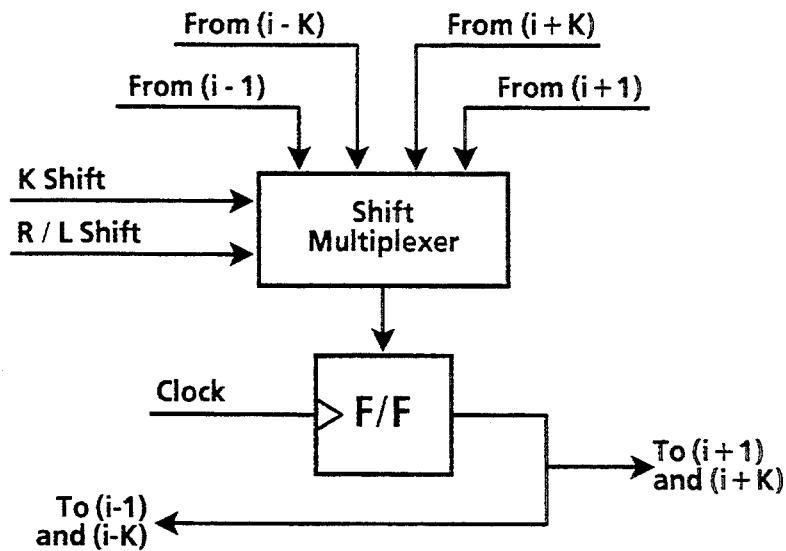
FIG. 11 is a schematic block diagram showing circuitry within edge crossing shift register 330 in FIG. 10.

FIG. 10 shows how K-bit shifting could be implemented using K-bit shifting circuitry in the implementation of FIG. 8. FIG. 11 shows special circuitry for performing K-bit shifting in shift register 330 in FIG. 8. FIG. 12 shows additional K-bit shifting circuitry that can perform a shift upon receiving data. FIG. 13 shows additional K-bit shifting circuitry that can perform a shift upon providing data.

In FIG. 10, processing units 302 through 304 are interconnected so that K bits of data can be transferred in parallel between processing units in a single cycle. As shown, K bits of data can be transferred between processing unit 302, numbered zero, and processing unit 402, numbered one; similarly, K bits of data can be transferred between processing unit 304, numbered (p−1), and processing unit 404, numbered (p−2). Four example, the leftmost and rightmost K bits in each processing unit's shift register could be connected to K parallel lines for connecting to the adjacent processing units on the left and right. In addition, each processing unit includes circuitry so that its shift register can be shifted by K bits in a single cycle.

Similarly, edge crossing shift register 330 is connected so that its leftmost K bits can be transferred to processing unit 304 through K-bit left shift circuitry 410 and so that its rightmost K bits can be transferred to processing unit 302 through K-bit right shift circuitry 412. Left shift circuitry 410 and right shift circuitry 412 could be implemented in a number of ways: Additional lines could connect edge crossing shift register 330 and processing units 302 and 304 so that K bits can be transferred in the same cycle during which K bits are transferred between adjacent processing units; or common bus 156 and additional shifting circuitry could be used to transfer K bits in two cycles, one to load the shifted data into memory in processing unit 302 or 304 and another to transfer the shifted data into the shift register.

FIG. 11 shows circuitry for storing the ith bit within edge crossing shift register 330 and for performing one bit and K-bit shift operations. Flip-flop 440 can store a bit of data received from shift multiplexer 442 in response to a clock signal that is provided in parallel to all bits of edge crossing shift register 330.

Prior to the clock signal, two other control signals are provided in parallel to each bit in edge crossing shift register 330—a right/left shift signal that is ON for a right shift and OFF for a left shift, and a K shift signal that is ON for a K-bit shift and OFF for a one bit shift. These signals control shift multiplexer 442.

If both control signals are ON, shift multiplexer 442 provides a value from the (i−K)th bit to flip-flop 440 for storage. If the right/left shift signal is ON and the K shift signal is OFF, shift multiplexer 442 provides a value from the (i−1)th bit. If both control signals are OFF, shift multiplexer 442 provides a value from the (i+1)th bit. And if the right/left shift Signal is OFF and the K shift signal is ON, shift multiplexer 442 provides a value from the (i+K)th bit.

Circuitry like that shown in FIG. 11 could be combined to form a two-dimensional array in which single bit shifts follow a serpentine path through the columns and K-bit shifts follow a path from column to column. Each column could include K units like that in FIG. 11, and each row could include (M/K) units, where M is the total number of units in the array. Each column of the array could be implemented as a shift register capable of receiving and providing K bits of data in parallel, and each column could be connected to each adjacent column to allow parallel transfer between adjacent columns during K-bit shifting. The lower end of each column could be connected to the upper end of the following column to allow serial transfer between adjacent columns during one-bit shifting.

FIGS. 12 and 13 illustrate K-bit shifting circuitry that provides an alternative to the circuitry in FIG. 11.

FIG. 12 shows circuitry for leftward K-bit shifting connected in parallel to edge crossing shift register 330. In response to control signals, edge crossing shift register 330 can provide an M-bit word to drive common bus 156. Left shifting circuitry 460 can receive the word and provide the leftmost K bits, $B_0$ through $B_{K-1}$, to processing unit 304. The remaining bits are stored in the leftmost (M−K) bits of register 462. The rightmost K bits of register 462, $B_M$ through $B_{M+K-1}$, can be loaded with K bits from processing unit 302. In response to control signals in the subsequent cycle, register 462 provides bits $B_K$ through $B_{M+K-1}$ on common bus 156 so that they can be loaded into edge crossing shift register 330, replacing bits $B_0$ through $B_{M-1}$.

FIG. 13 shows similar circuitry for rightward K-bit shifting, with right shifting circuitry 480 providing the rightmost K bits to processing unit 302 and the remaining bits to register 482. The leftmost K bits of register 482 can be loaded with K bits from processing unit 304. Register 482 can provide bits $B_{1-K}$ on common bus 156 so that they can be loaded into edge crossing shift register 330.

In FIGS. 12 and 13, left shifting circuitry 460 and right shifting circuitry 480 can each be implemented with transceivers or multiplexers that determine which bits from common bus 156 are loaded into register 462 and register 482, respectively.

K-bit shifting can be performed in two cycles using the circuitry of FIGS. 12 and 13. This is faster than the K cycles that would be required if edge crossing circuitry 330 is a simple shift register and K>2. The circuitry of FIGS. 12 and 13 is also easier to implement with conventional components than the circuitry of FIG. 11.

Various other alternatives could be used instead of the circuitry shown in FIGS. 12 and 13. For example, registers 462 and 482 could each be M-bits wide, and left shifting circuitry 460 and right shifting circuitry 480 could be connected to receive outputs from the registers rather than to provide inputs. Further, left shifting circuitry 460 and right shifting circuitry 480 could instead be connected between edge crossing shift register 330 and common bus 156, either to perform shifting on data provided by edge crossing shift register 330 or to perform shifting on data from common bus 156.

3. Microinstruction Sequences

FIG. 14 shows acts in executing a sequence of microinstructions that perform a leftward edge crossing operation. FIG. 15 shows acts in executing a sequence of microinstructions that perform a rightward edge crossing operation. Both sequences include steps similar to steps described in relation to FIGS. 9–13 of the Common Bus application. As in the Common Bus application, each box in FIGS. 14 and 15 represents acts performed during a single clock cycle, and acts in addition to those shown in FIGS. 14 and 15 could be performed during the same clock cycles in response to appropriate microinstructions.

In addition to the microinstruction fields mentioned above in relation to FIG. 5, each microinstruction could include a two bit field indicating control signals for edge crossing shift register 330. One value could indicate no operation, another a shift left, another a shift right, and another a load from common bus 156.

In FIG. 14, clock cycle 500 includes an act that begins a leftward edge crossing operation by fetching a first microinstruction (μinst1). μinst1 can include information specifying an operation of each of processing units 302 through 304 that transfers data to the respective one of registers 312 through 314, shown in FIG. 8, as in clock cycle 352 in FIG. 9 or clock cycle 372 in FIG. 10 in the Common Bus application.

Clock cycle 502 includes an act that executes μInst1, providing signals that load data into each processing unit's register, as in clock cycle 354 in FIG. 9 or clock cycle 374 in FIG. 10 in the Common Bus application. Transferred data comes from the same image line as the data in the array wide shift register. Clock cycle 502 also includes an act that fetches a second microinstruction (μInst2) whose address was loaded into MAR 152 during clock cycle 500. μInst2 specifies operations that transfer data from register 312 into edge crossing shift register 330. In the implementation of FIG. 8, for example, μInst2 can specify register 312 as a source for data on common bus 156 and can specify a load operation by edge crossing shift register 330.

Clock cycle 504 includes an act that executes μInst2, providing signals that select register 312 as a source for common bus 156 and signals to edge crossing shift register 330 to load data from common bus 156. Clock cycle 504 also includes an act that fetches a third microinstruction (μInst3) whose address was loaded into MAR 152 during clock cycle 502. μInst3 specifies operations that shift data leftward within the array wide shift register and edge crossing shift register 330. μInst3 can specify a shift left operation by each of processing units 302 through 304 and a shift left operation by edge crossing shift register 330.

Clock cycle 506 includes an act that executes μInst3, providing signals to processing units 302 through 304 and to edge crossing shift register 330 so that data is shifted leftward. Clock cycle 506 also includes an act that fetches a fourth microinstruction (μInst4) whose address was loaded into MAR 152 during clock cycle 504. μInst4 specifies an operation that each processing unit can perform using data from its portion of the array wide shift register.

Clock cycle 508 includes an act that executes μInst4, providing signals to the processing units so that they perform the specified operation. Clock cycle 508 also includes an act that fetches a next microinstruction. As suggested by the dashed lines in FIG. 14, the next microinstruction could be similar to μInst1 or μInst3, for example. A series of leftward and rightward shifts with edge crossing operations could be performed by looping through acts similar to those in clock cycles 506 and 508 until a word boundary is reached. Then, a word from the next processing unit across the edge could be loaded by performing acts similar to those in clock cycles 502 and 504. If the word boundary is at the edge of an image, edge crossing shift register could instead be cleared so that zeros are shifted into the array wide shift register.

In FIG. 15, clock cycle 520 includes an act that begins a rightward edge crossing operation by fetching a first microinstruction (μInst1). As in clock cycle 500 in FIG. 14, μInst1 can include information specifying an operation of each of processing units 302 through 304 that transfers data to the respective one of registers 312 through 314.

Clock cycle 522 includes an act that executes μInst1, providing signals that load data into each processing unit's register, as in clock cycle 502 in FIG. 14. Clock cycle 522 also includes an act that fetches a second microinstruction (μInst2) whose address was loaded into MAR 152 during clock cycle 520. μInst2 specifies operations that transfer data from register 314 into edge crossing shift register 330. In the implementation of FIG. 8, for example, μInst2 can specify register 314 as a source for data on common bus 156 and can specify a load operation by edge crossing shift register 330.

Clock cycle 524 includes an act that executes μInst2, providing signals that select register 314 as a source for common bus 156 and signals to edge crossing shift register 330 to load data from common bus 156. Clock cycle 524 also includes an act that fetches a third microinstruction (μInst3) whose address was loaded into MAR 152 during clock cycle 522. μInst3 specifies operations that shift data rightward within the array wide shift register and edge crossing shift register 330. μInst3 can specify a shift right operation by each of processing units 302 through 304 and a shift right operation by edge crossing shift register 330.

Clock cycle 526 includes an act that executes μInst3, providing signals to processing units 302, through 304 and to edge crossing shift register 330 so that data is shifted rightward. Clock cycle 526 also includes an act that fetches a fourth microinstruction (μInst4) whose address was loaded into MAR 152 during clock cycle 524. μInst4 specifies an operation that each processing unit can perform using data from its portion of the array wide shift register.

Clock cycle 528 includes an act that executes μInst4, providing signals to the processing units so that they perform the specified operation, as in clock cycle 508 in FIG. 14. Clock cycle 528 also includes an act that fetches a next microinstruction. As suggested by the dashed lines in FIG. 15, the next microinstruction could be similar to μInst1 or μInst3, for example. A series of leftward and rightward shifts with edge crossing operations could be performed by looping through acts similar to those in clock cycles 526 and 528 until a word boundary is reached. Then, a word from the next processing unit across the edge could be loaded by performing acts similar to those in clock cycle 522 and 524. If the word boundary is at the edge of an image, edge crossing shift register could instead be cleared so that zeros are shifted into the array wide shift register.

The acts described in relation to FIGS. 14 and 15 could be suitably modified to handle multi-bit pixels. For example, the acts in boxes 506 and 526 could be repeated K times to perform K-bit shifting. Or the acts in boxes 506 and 526 could be replaced by other acts using special circuitry like that described above in relation to FIGS. 10–13.

In addition, the acts described in relation to FIGS. 14 and 15 could be interspersed with other operations. In general, edge crossing shift register 330 can be loaded at any time that SRAM 240 and common bus 156 are not busy. If edge crossing shift register 330 can be loaded while the processing units are performing other operations internally, data can be shifted as quickly as if the array wide shift register extended across an entire image, eliminating performance overhead for edge crossing operations.

F. Specific Applications

The invention could be applied in many ways, including image processing of the type described in U.S. Pat. Nos. 5,065,437; 5,048,109; 5,129,014; and 5,131,049. Such image processing techniques use data defining a first image to obtain a second image through operations such as erosion and dilation, operations that are defined in the Serra books cited above. Such operations can, for example, be performed by a series of suboperations each of which shifts an original image to obtain a shifted image and then performs a Boolean operation with values from the original image and the shifted image at each location. To perform such operations on a parallel processor, an image may be handled in segments as described above.

The invention could also be applied to perform various other image processing operations, such as gray scale or color convolution, skew detection, image rotation, and image scaling by factors other than integer powers of two.

G. Miscellaneous

The invention has been described in relation to implementations in which an edge crossing shift register has the same number of bits as each processing unit and as a bus connected between them. The invention might also be implemented with a common bus of a different number of bits than the processing units, such as twice as many, and the edge crossing shift register could have some number of bits no greater than the number of the common bus. In addition, the data transfer circuitry could include additional bus circuitry as described in copending coassigned U.S. patent application Ser. No. 07/993,939 entitled "Subsampling and Spreading Circuitry for SIMD Architecture," incorporated herein by reference.

The invention has been described in relation to implementations in which each processing unit in an array includes one shift register interconnected to shift registers in other processing units to form an array-wide shift register, and in which a single edge crossing shift register is connected between the ends of the array-wide shift register. The invention could also be implemented, however, with an edge crossing shift register at each end of the array-wide shift register. Further, the invention could be implemented with plural array-wide shift registers and with an edge crossing shift register for each array-wide shift register.

The invention has been described in relation to a specific processing unit structure, but the invention could be implemented with a wide variety of processing unit structures. Similarly, the invention has been described in relation to specific edge crossing circuitry, but the invention could be implemented with a wide variety of edge crossing circuitry. For example, the edge crossing circuitry might include an additional processing unit connected at an edge of a processing unit array, with the edge crossing shift register being a shift; register in the additional processing unit.

The invention has been described in relation to implementations in which processing units are connected into a one-dimensional array. The invention might also be implemented with a parallel processor in which the processing units are connected into a two- or three-dimensional array or into any other suitable arrangement.

The invention has been described in relation to implementations in which bits remain uninverted while being transferred between components in a parallel processor. The invention might also be implemented with inversions during data transfer to increase performance, such as an inversion when an item of data is loaded into a holding register and another inversion when the item of data is read out of the holding register.

The invention has been described in relation to an implementation that includes a SIMD parallel processor in which coprocessor control circuitry has two control lines to each processing unit, one to select a register as a source of data on a common bus and the other to write enable the processing unit's memory. The invention might be implemented with other types of parallel processors. For example, the invention could be implemented with additional lines to each processing unit, such as separate instruction and address lines so that each processing unit could operate independently of other processing units. In addition, special write enable lines could be provided to write independently in the memories of different processing units or independently in the memory of a specific microprocessor in each processing unit.

The invention has been described in relation to implementations in which control circuitry provides addresses in parallel to processing units. The invention might also be implemented with a parallel processor in which processing units independently obtain addresses, such as from a local address processor or from an address processor that serves a subset of processing units.

The invention has been described in relation to implementations in which processing units include single port memory circuitry. The invention might also be implemented with dual port memory circuitry.

The invention has been described in relation to implementations in which a 32 bit bus interconnects 32 bit registers and in which each processing unit includes two 16 bit microprocessors and a 32 bit SRAM. The invention might also be implemented in numerous other ways with components having different widths. For example, each processing unit might include a 16 bit SRAM for each microprocessor or each processing unit might include a single 32 bit microprocessor. Alternatively, the bus might be a 16 bit or 64 bit bus, and other components could be chosen accordingly. Similarly, the control store, described as implemented with 128 bit microinstructions, might also be implemented with microinstructions of other lengths, such as 64 bit encoded microinstructions. Further the invention might be implemented with a dedicated control store chip.

The invention has been described in relation to implementations that operate on data relating to images, but might also be implemented to operate on data that do not relate to an image.

The invention has been described in relation to implementations that include readily available discrete components. The invention might also be implemented with custom VLSI components, and similarly with custom memory components.

The invention has been described in relation to implementations in which each processing unit includes SRAM, but the invention might also be implemented with other types of memory, such as dynamic RAM, flash RAM, and so forth.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed:

1. A parallel processor comprising:
   four or more processing units;
   edge crossing circuitry for receiving an item of data that includes two or more bits and for bit serially providing the item of data; the edge crossing circuitry comprising an edge crossing shift register;
   interconnecting circuitry for interconnecting a set of at least two of the processing units and the edge crossing circuitry; each processing unit in the set of at least two of the processing units comprising an internal shift register;
   the interconnecting circuitry interconnecting pairs of the processing units in the set to form an array of processing units that includes all the processing units in the set, the array including a first edge processing unit that is in the set and is at a first edge of the array;
   the interconnecting circuitry interconnecting the internal shift register of each processing unit in each pair of processing units to the internal shift register of the other processing unit in the pair so that an item of data from the internal shift register of either of the processing units in the pair can be transferred to the internal shift register of the other processing unit in the pair;
   the interconnecting circuitry further connecting the edge crossing circuitry and the first edge processing unit so that items of data from the edge crossing shift register can be transferred bit serially to the internal shift register of the first edge processing unit; the internal shift register of each of the processing units in the set and the edge crossing shift register together forming an extended shift register;
   data transfer circuitry connecting the array of processing units to the edge crossing circuitry so that the data transfer circuitry can transfer an item of data obtained from the array of processing units to the edge crossing circuitry; and
   control circuitry connected for providing control signals to the array of processing units, the data transfer circuitry, and the edge crossing circuitry; the control signals causing the data transfer circuitry to transfer a first item of data obtained from the array of processing units to the edge crossing circuitry, causing a shift of the extended shift register so that the edge crossing shift register provides a bit from the first item of data to the processing unit shift register of the first edge processing unit through the interconnecting circuitry, and causing the array of processing units to perform an operation;
   the first item of data relating to part of a first segment of an image, the image also including a second segment adjacent to the first segment;
   in performing the operation, one of the processing units using the bit from the first item of data to obtain a second item of data relating to a part of the second segment that is across an edge from the part of the first segment.

2. The parallel processor of claim 1 in which the first segment and the second segment are adjacent along the edge.

3. The parallel processor of claim 1 in which the first item of data includes a sequence of pixel values, each pixel value including K bits where K is greater than one; the interconnecting circuitry further interconnecting the edge crossing circuitry and the first edge processing unit so that a K-bit item of data from the edge crossing shift register can be transferred in parallel to the first edge processing unit.

4. The parallel processor of claim 1 in which the first item of data includes a sequence of pixel values, each pixel value including K bits where K is greater than one; the edge crossing shift register further comprising K-bit shifting circuitry for shifting an item of data by K bits within the edge crossing shift register.

5. The parallel processor of claim 1 in which the first item of data includes a sequence of pixel values, each pixel value including K bits where K is greater than one; the edge crossing circuitry further comprising K-bit shifting circuitry for receiving an item of data from the edge crossing shift register and for using the item of data to provide a K-bit shifted version of the item of data to the edge crossing shift register.

6. The parallel processor of claim 1 in which the first item of data includes a sequence of binary pixel values.

7. The parallel processor of claim 1 in which the control signals cause the edge crossing shift register and the internal shift register of the first edge processing unit to shift concurrently.

8. The parallel processor of claim 7 in which the interconnecting circuitry interconnects the edge crossing shift register to the internal shift register of the first edge processing unit so that items of data can be transferred bit serially from the internal shift register of the first edge processing unit to the edge crossing shift register; the control signals further causing the edge crossing shift register and the internal shift register of the first edge processing unit to shift concurrently so that a bit of data provided by the internal shift register of the first edge processing unit is received by the edge crossing shift register.

9. The parallel processor of claim 1 in which the array further includes a second edge processing unit at a second edge of the array; the interconnecting circuitry further connecting the edge crossing circuitry and the second edge processing unit so that items of data from the edge crossing circuitry can be transferred bit serially to the second edge processing unit.

10. The parallel processor of claim 9 in which the first edge processing unit comprises a first internal shift register and the second edge processing unit comprises a second internal shift register; the edge crossing shift register having a first end and a second end; the interconnecting circuitry interconnecting the edge crossing shift register and the first and second internal shift registers so that items of data from the second internal shift register can be transferred bit serially to the second end of the edge crossing shift register and so that items of data from the first end of the edge crossing shift register can be transferred bit serially to the first internal shift register; the control signals further causing the edge crossing shift register and the first and second internal shift registers to shift concurrently so that when a bit from the second internal shift register is transferred to the second end of the edge crossing shift register, another bit from the first end of the edge crossing shift register is transferred to the first internal shift register.

11. The parallel processor of claim 10 in which the interconnecting circuitry further interconnects the edge crossing shift register and the first and second internal shift registers so that items of data from the first internal shift register can be transferred bit serially to the first end of the edge crossing shift register and so that items of data from the second end of the edge crossing shift register can be transferred bit serially to the second internal shift register; the control signals further causing the edge crossing shift register and the first and second internal shift registers to shift concurrently so that when a bit from the first internal shift register is transferred to the first end of the edge crossing shift register, another bit from the second end of the edge crossing shift register is transferred to the second internal shift register.

12. The parallel processor of claim 9 in which the control signals further cause the second edge processing unit to provide the first item of data for transfer to the edge crossing circuitry.

13. The parallel processor of claim 1 in which each processing unit comprises processing circuitry for responding to instructions by performing operations on items of data; the control circuitry further providing a series of items of instruction data to the processing circuitry of each of the processing units; the items of instruction data indicating a sequence of instructions; the control circuitry being connected for providing each item in the series to the processing circuitry of all of the processing units in parallel.

14. The parallel processor of claim 1 in which the array further includes a second edge processing unit at a second edge of the array; the interconnecting circuitry further connecting the edge crossing shift register and the internal shift register of the second edge processing unit so that items of data from the second edge processing unit can be transferred bit serially to the edge crossing circuitry; the control signals causing the shift of the extended shift register so that the internal shift register of the second edge processing unit provides a bit to the edge crossing shift register.

* * * * *